United States Patent
Geng et al.

(10) Patent No.: US 11,622,339 B2
(45) Date of Patent: Apr. 4, 2023

(54) COMMUNICATION METHOD AND COMMUNICATIONS APPARATUS

(71) Applicant: Huawei Technologies Co., Ltd., Shenzhen (CN)

(72) Inventors: Tingting Geng, Shanghai (CN); Jinyao Liang, Shenzhen (CN); Le Yan, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 17/094,597

(22) Filed: Nov. 10, 2020

(65) Prior Publication Data

US 2021/0058879 A1  Feb. 25, 2021

Related U.S. Application Data

(63) Continuation of application No. PCT/CN2019/086481, filed on May 10, 2019.

(30) Foreign Application Priority Data

May 11, 2018  (CN) .......................... 201810450465.5

(51) Int. Cl.
  *H04W 56/00*  (2009.01)
  *H04W 36/08*  (2009.01)
  (Continued)

(52) U.S. Cl.
  CPC ......... *H04W 56/001* (2013.01); *H04L 5/0094* (2013.01); *H04W 36/0061* (2013.01);
  (Continued)

(58) Field of Classification Search
  None
  See application file for complete search history.

(56) References Cited

U.S. PATENT DOCUMENTS

| | | | |
|---|---|---|---|
| 2018/0109345 A1 | 4/2018 | Svedman et al. | |
| 2018/0279238 A1* | 9/2018 | Zhou .................... | H04W 72/12 |

(Continued)

FOREIGN PATENT DOCUMENTS

| | | |
|---|---|---|
| CN | 104581840 A | 4/2015 |
| CN | 106793058 A | 5/2017 |

(Continued)

OTHER PUBLICATIONS

Huawei, HiSilicon, "BWP issues for EN-DC completion", 3GPP TSG-RAN WG2 Meeting #100, R2-1712322, Nov. 27-Dec. 1, 2017, 5 pages, Reno, USA.

(Continued)

*Primary Examiner* — Saba Tsegaye
(74) *Attorney, Agent, or Firm* — Slater Matsil, LLP

(57) ABSTRACT

This application discloses a communication method and a communications apparatus, and relates to the communications field, to reduce power consumption of a terminal. The communication method includes: determining, by a first network device, first information, where the first information includes type information of a synchronization signal block, and the type information of the synchronization signal block is used to indicate that the synchronization signal block is a cell-defined synchronization signal block or a non-cell-defined synchronization signal block; and sending, by the first network device, the first information to a second network device. Embodiments of this application are applied to an indication of the cell-defined or non-cell-defined synchronization signal block.

12 Claims, 11 Drawing Sheets

(51) Int. Cl.
*H04W 36/00* (2009.01)
*H04W 72/04* (2009.01)
*H04L 5/00* (2006.01)
*H04W 72/0453* (2023.01)

(52) U.S. Cl.
CPC ....... *H04W 36/0072* (2013.01); *H04W 36/08* (2013.01); *H04W 72/042* (2013.01); *H04W 72/0453* (2013.01)

(56) References Cited

U.S. PATENT DOCUMENTS

| | | | | |
|---|---|---|---|---|
| 2019/0306832 | A1* | 10/2019 | Si | H04J 11/0069 |
| 2021/0136663 | A1* | 5/2021 | Liu | H04W 48/16 |
| 2021/0176670 | A1* | 6/2021 | Keskitalo | H04W 24/08 |

FOREIGN PATENT DOCUMENTS

| | | |
|---|---|---|
| CN | 106793059 A | 5/2017 |
| CN | 107736060 A | 2/2018 |
| CN | 108012329 A | 5/2018 |
| WO | 2017186288 A1 | 11/2017 |

OTHER PUBLICATIONS

ZTE Corporation, Sanechips, "Consideration on ReportCGI measurement", 3GPP TSG-RAN WG2 Meeting #101, R2-1804380, Feb. 26-Mar. 2, 2018, 4 pages, Athens, Greece.
3GPP TS 38.473 V15.1.1 (Apr. 2018); 3rd Generation Partnership Project; Technical Specification Group Radio Access Network; NG-RAN; F1 application protocol (F1AP) (Release 15), 106 pages.
Samsung, "Remaining details on SS burst set related procedures", 3GPP TSG RAN WG1 Meeting NR#3, R1-1715908, Sep. 18-21, 2017, 9 pages, Nagoya, Japan.
3GPP TS 38.331 V15.1.0 (Mar. 2018); 3rd Generation Partnership Project; Technical Specification Group Radio Access Network; NR; Radio Resource Control (RRC) protocol specification (Release 15), 268 pages.
3GPP TS 36.423 V15.1.0 (Mar. 2018); 3rd Generation Partnership Project; Technical Specification Group Radio Access Network; Evolved Universal Terrestrial Radio Access Network (E-UTRAN); X2 application protocol (X2AP) (Release 15), 354 pages.
3GPP TS 38.300 V15.1.0 (Mar. 2018); 3rd Generation Partnership Project; Technical Specification Group Radio Access Network; NR; NR and NG-RAN Overall Description; Stage 2 (Release 15), 71 pages.
Huawei et al., "On initial access for wideband carrier", 3GPP TSG RAN WG1 NR ad Hoc Meeting, R1-1709973, Jun. 27-30, 2017, 4 pages, Qingdao, China.
"Clarification on the usage of SSB", ZTE Corporation, Sanechips, 3GPP TSG-RAN WG2 Meeting #101, R2-1802164, Feb. 26-Mar. 2, 2018, 10 pages, Athens, Greece.
Huawei et al., "Detailed design of the contents of System Information", 3GPP TSG-RAN2 Meeting #99bis, R2-1710458, Oct. 9-13, 2017, 8 pages, Prague, Czech Republic.
CATT, "Discussion on inter-node RRC container", 3GPP TSG RAN WG3 #98 R3-174534, Dec. 1-27, 2017, 8 pages, Reno, Nevada, USA.
Mediatek Inc., "TP to 38.300 on Cell-Defining SSB", 3GPP TSG RAN WG2 #101bis R2-1804610 Apr. 16-20, 2018, 5 pages, Sanya, China.
OPPO, "Discussion on UE redistribution within wideband carrier", 3GPP TSG RAN WG2 #101bis R2-1804561, Apr. 16-20, 2018, 3 pages, Sanya, P.R. China.
Huawei, "(TP for BL CR for TS 38.423): SSB type indication over Xn", 3GPP TSG RAN WG3 #102 R3-186489, Nov. 12-16, 2018, 5 pages, Spokane, US.

* cited by examiner

COMMUNICATION METHOD AND COMMUNICATIONS APPARATUS

CROSS-REFERENCE TO RELATED APPLICATIONS

This application is a continuation of International Application No. PCT/CN2019/086481, filed on May 10, 2019, which claims priority to Chinese Patent Application No. 201810450465.5, filed on May 11, 2018. The disclosures of the aforementioned applications are hereby incorporated by reference in their entireties.

TECHNICAL FIELD

This application relates to the communications field, and in particular, to a communication method and a communications apparatus.

BACKGROUND

One cell of a radio access network (RAN) includes one or more synchronization signal blocks, and a terminal determines signal quality by measuring synchronization signal blocks at various frequencies. The synchronization signal blocks are classified, according to types, into a cell-defined (cell defining) synchronization signal block and a non-cell-defined (non cell defining) synchronization signal block. The cell-defined synchronization signal block supports initial access, camping, cell reselection, or cell selection of the terminal, and the non-cell-defined synchronization signal block does not support initial access, camping, cell reselection, or cell selection of the terminal. The terminal measures the non-cell-defined synchronization signal block, but cannot perform initial access, camping, cell reselection, or cell selection on the corresponding synchronization signal block. Consequently, unnecessary power consumption of the terminal is caused.

SUMMARY

Embodiments of this application provide a communication method and a communications apparatus, to reduce power consumption of a terminal.

To achieve the foregoing objective, the following technical solutions are used in the embodiments of this application.

According to a first aspect, a communication method is provided. The method includes: determining, by a first network device, first information, where the first information includes type information of a synchronization signal block, and the type information of the synchronization signal block is used to indicate that the synchronization signal block is a cell-defined synchronization signal block or a non-cell-defined synchronization signal block; or the type information of the synchronization signal block is used to indicate whether the synchronization signal block supports initial access, camping, cell reselection, or cell selection; or the type information of the synchronization signal block is used to indicate whether the synchronization signal block is used to send basic system information; and sending, by the first network device, the first information to a second network device. According to the communication method in this embodiment of this application, the first network device sends the first information of the synchronization signal block to the second network device, where the first information includes the type information indicating that the synchronization signal block is the cell-defined synchronization signal block or the non-cell-defined synchronization signal block. The second network device configures, for a terminal, the cell-defined synchronization signal block, or the second network device indicates, to a terminal, frequency information and type information for configuring at least one synchronization signal block, so that the terminal determines a location of the cell-defined synchronization signal block in frequency domain. According to the communication method in this embodiment of this application, the terminal can be prevented from blindly searching all frequencies, and only measure a synchronization signal block (that is, the cell-defined synchronization signal block) that can be used for initial access, camping, cell reselection, or cell selection. This can reduce power consumption for measuring the synchronization signal block when the terminal performs initial access, camping, cell reselection, or cell selection.

In a possible implementation, the synchronization signal block is at least one synchronization signal block of a first cell or a first carrier of the first network device. In this implementation, the second network device can learn of configuration of a synchronization signal block of a cell or a carrier of the first network device.

In a possible implementation, the synchronization signal block is a synchronization signal block of a second cell or a second carrier of the second network device, and the type information of the synchronization signal block is determined based on resource use information of the first network device. In this implementation, a synchronization signal block of a cell or a carrier of the second network device can be adjusted based on the resource use information of the first network device.

In a possible implementation, the synchronization signal block is a synchronization signal block of a second cell or a second carrier of the second network device, and the method further includes: receiving, by the first network device from the second network device, resource use information of the second cell or the second carrier. The determining, by a first network device, first information includes: determining, by the first network device, type information of the synchronization signal block of the second cell or the second carrier of the second network device based on the resource use information of the second cell or the second carrier. In this implementation, a synchronization signal block of a cell or a carrier of the second network device can be adjusted based on resource use information of the second network device.

In a possible implementation, the first network device is configured to perform functions of a radio resource control (RRC) layer, a service data adaptation protocol (SDAP) layer, and a packet data convergence protocol (PDCP) layer; and the second network device is configured to perform functions of a radio link control (RLC) layer, a media access control (MAC) layer, and a physical layer. This implementation provides a possible protocol layer division manner in which the first network device serves as a CU and the second network device serves as a DU.

In a possible implementation, the first information further includes at least one of the following information: information used to indicate a subcarrier spacing of the synchronization signal block in frequency domain; measurement information of the synchronization signal block; information used to indicate whether timing synchronization is achieved between a neighboring cell and a serving cell or between a synchronization signal block of a neighboring cell and a serving synchronization signal block; and information used to determine whether synchronization signal blocks are synchronized in time domain. This implementation provides a possible implementation of further determining information about a location of a synchronization signal block.

According to a second aspect, a communication method is provided. The method includes: receiving, by a second network device, first information from a first network device, where the first information includes type information of a first synchronization signal block, and the type information of the first synchronization signal block is used to indicate that the first synchronization signal block is a cell-defined synchronization signal block or a non-cell-defined synchronization signal block; or the type information of the synchronization signal block is used to indicate whether the synchronization signal block supports initial access, camping, cell reselection, or cell selection; or the type information of the synchronization signal block is used to indicate whether the synchronization signal block is used to send basic system information; and sending, by the second network device, second information, where the second information is determined based on the first information. According to the communication method in this embodiment of this application, the first network device sends the first information of the synchronization signal block to the second network device, where the first information includes the type information indicating that the synchronization signal block is the cell-defined synchronization signal block or the non-cell-defined synchronization signal block. The second network device configures, for a terminal, the cell-defined synchronization signal block, or the second network device indicates, to a terminal, frequency information and type information for configuring at least one synchronization signal block, so that the terminal determines a location of the cell-defined synchronization signal block in frequency domain. According to the communication method in this embodiment of this application, the terminal can be prevented from blindly searching all frequencies, and only measure a synchronization signal block (that is, the cell-defined synchronization signal block) that can be used for initial access, camping, cell reselection, or cell selection. This can reduce power consumption for measuring the synchronization signal block when the terminal performs initial access, camping, cell reselection, or cell selection.

In a possible implementation, the first synchronization signal block is at least one synchronization signal block of a first cell or a first carrier of the first network device. In this implementation, the second network device can learn of configuration of a synchronization signal block of a cell or a carrier of the first network device.

In a possible implementation, the first synchronization signal block is a synchronization signal block of a second cell or a second carrier of the second network device, and the method further includes: sending, by the second network device, resource use information of the second cell or the second carrier to the first network device. In this implementation, a synchronization signal block of a cell or a carrier of the second network device can be adjusted based on resource use information of the second network device.

In a possible implementation, the second information includes frequency information of a cell-defined second synchronization signal block. In this implementation, the network device can indicate a location of the cell-defined synchronization signal block to the terminal.

In a possible implementation, the second information includes frequency information and type information of a second synchronization signal block. In this implementation, the network device can indicate locations of the cell-defined synchronization signal block and the non-cell-defined synchronization signal block to the terminal.

In a possible implementation, the first network device is configured to perform functions of a radio resource control (RRC) layer, a service data adaptation protocol (SDAP) layer, and a packet data convergence protocol (PDCP) layer; and the second network device is configured to perform functions of a radio link control (RLC) layer, a media access control (MAC) layer, and a physical layer. This implementation provides a possible protocol layer division manner in which the first network device serves as a CU and the second network device serves as a DU.

In a possible implementation, the first information or the second information further includes at least one of the following information: information used to indicate a subcarrier spacing of the synchronization signal block in frequency domain; measurement information of the synchronization signal block; information used to indicate whether timing synchronization is achieved between a neighboring cell and a serving cell or between a synchronization signal block of a neighboring cell and a serving synchronization signal block; and information used to determine whether synchronization signal blocks are synchronized in time domain. This implementation provides a possible implementation of further determining information about a location of a synchronization signal block.

According to a third aspect, a communication method is provided. The method includes: receiving frequency information and type information of at least one synchronization signal block, where the type information of the synchronization signal block is used to indicate that the synchronization signal block is a cell-defined synchronization signal block or a non-cell-defined synchronization signal block; or the type information of the synchronization signal block is used to indicate whether the synchronization signal block supports initial access, camping, cell reselection, or cell selection; or the type information of the synchronization signal block is used to indicate whether the synchronization signal block is used to send basic system information; and measuring the synchronization signal block based on the frequency information and the type information of the at least one synchronization signal block. According to the communication method in this embodiment of this application, a first network device sends first information of the synchronization signal block to a second network device, where the first information includes the type information indicating that the synchronization signal block is the cell-defined synchronization signal block or the non-cell-defined synchronization signal block. The second network device configures, for a terminal, the cell-defined synchronization signal block, or the second network device indicates, to a terminal, frequency information and type information for configuring the at least one synchronization signal block, so that the terminal determines a location of the cell-defined synchronization signal block in frequency domain. According to the communication method in this embodiment of this application, the terminal can be prevented from blindly searching all frequencies, and only measure a synchronization signal block (that is, the cell-defined synchronization signal block) that can be used for initial access, camping, cell reselection, or cell selection. This can reduce power consumption for measuring the synchronization signal block when the terminal performs initial access, camping, cell reselection, or cell selection.

In a possible implementation, the measuring the synchronization signal block based on the frequency information and the type information of the at least one synchronization signal block includes: measuring, based on the frequency information, the cell-defined synchronization signal block indicated by the type information. This implementation provides a manner in which the terminal measures the cell-defined synchronization signal block.

According to a fourth aspect, a first communications apparatus is provided, configured to perform the method according to the first aspect and the possible implementations of the first aspect.

According to a fifth aspect, a second communications apparatus is provided, configured to perform the method according to the second aspect and the possible implementations of the second aspect.

According to a sixth aspect, a communications apparatus is provided, configured to perform the method according to the third aspect and the possible implementations of the third aspect.

According to a seventh aspect, a communications system is provided, including the first communications apparatus according to the fourth aspect and the second communications apparatus according to the fifth aspect. Optionally, the communications system may also include the communications apparatus according to the sixth aspect.

According to an eighth aspect, an embodiment of this application provides a communications apparatus, including a processor and a memory. The memory is configured to store a program, and the processor invokes the program stored in the memory, to perform the method according to the first aspect and the possible implementations of the first aspect, or perform the method according to the second aspect and the possible implementations of the second aspect, or perform the method according to the third aspect and the possible implementations of the third aspect.

According to a ninth aspect, an embodiment of this application provides a storage medium. The storage medium stores a computer program, and when the computer program is executed by a processor, the method according to the first aspect and the possible implementations of the first aspect is performed, or the method according to the second aspect and the possible implementations of the second aspect is performed, or the method according to the third aspect and the possible implementations of the third aspect is performed.

According to a tenth aspect, an embodiment of this application provides a computer program product. When the computer program product runs on a communications apparatus, the communications apparatus performs the method according to the first aspect and the possible implementations of the first aspect, or performs the method according to the second aspect and the possible implementations of the second aspect, or performs the method according to the third aspect and the possible implementations of the third aspect.

According to an eleventh aspect, an embodiment of this application provides a chip system, including a processor, configured to support a communications apparatus in performing the method according to the first aspect and the possible implementations of the first aspect, or performing the method according to the second aspect and the possible implementations of the second aspect, or performing the method according to the third aspect and the possible implementations of the third aspect.

For technical effects of the fourth aspect to the eleventh aspect, refer to the content in the first aspect to the third aspect.

DETAILED DESCRIPTION OF ILLUSTRATIVE EMBODIMENTS

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The embodiments of this application may be applied to a time division duplexing (TDD) scenario, or may be applied to a frequency division duplexing (FDD) scenario. In the embodiments of this application, a scenario of a fifth generation (5G) communications network in a wireless communications network is used as an example for description. It should be noted that the solutions in the embodiments of this application may be further applied to another wireless communications network, and a corresponding name may also be replaced with a name of a corresponding function in another wireless communications network.

Figure 1:
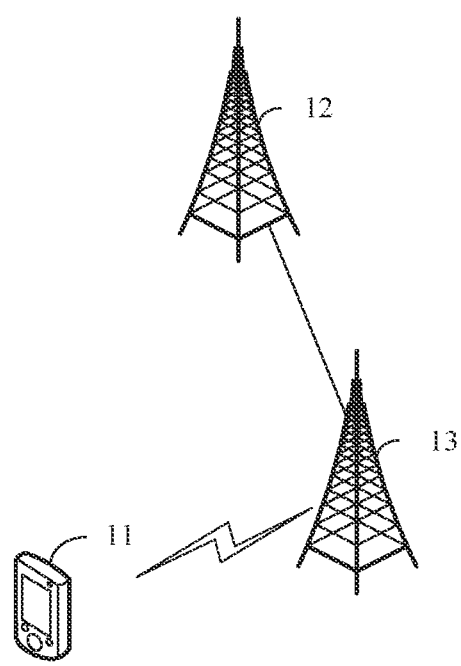
FIG. 1 is a schematic structural diagram of a communications system according to an embodiment of this application.

An embodiment of this application provides a communications system. Referring to FIG. 1, the communications system includes at least one terminal 11, a first network device 12, and a second network device 13.

Optionally, the terminal 11 in the embodiments of this application may include various handheld devices, vehicle-mounted devices, wearable devices, and computing devices that have a wireless communication function, or other processing devices connected to a wireless modem. The terminal may further include a subscriber unit, a cellular phone, a smartphone, a wireless data card, a personal digital assistant (PDA) computer, a tablet computer, a wireless modem, a handheld device (handheld), a laptop computer, a cordless phone or a wireless local loop (WLL) station, a machine type communication (MTC) terminal, user equipment (UE), a mobile station (MS), a terminal device, relay user equipment, or the like. The relay user equipment may be, for example, a 5G residential gateway (RG). For ease of description, the devices mentioned above may be collectively referred to as the terminal.

Figure 2:
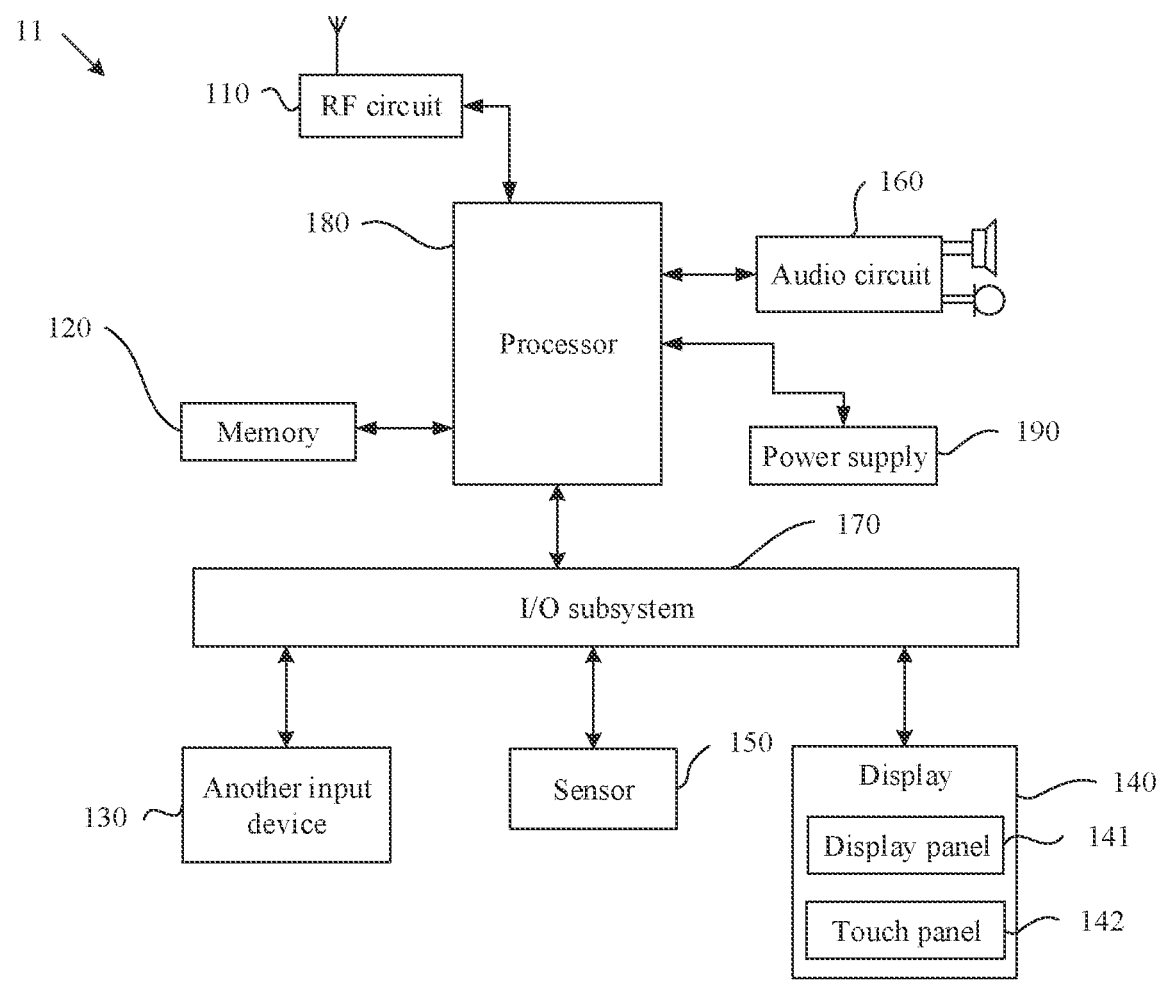
FIG. 2 is a schematic structural diagram 1 of a terminal according to an embodiment of this application.

An example in which the terminal 11 is a mobile phone is used to describe a hardware architecture of the mobile phone. As shown in FIG. 2, the mobile phone may include components such as a radio frequency (RF) circuit 110, a memory 120, another input device 130, a display 140, a sensor 150, an audio circuit 160, an I/O subsystem 170, a processor 180, and a power supply 190. A person skilled in the art may understand that a structure of the mobile phone shown in the figure does not constitute any limitation on the mobile phone, and may include more or fewer components than those shown in the figure, or some components may be combined, or some components may be split, or different component arrangements may be used. A person skilled in the art may understand that the display 140 is a user interface (UI), and the display 140 may include a display panel 141 and a touch panel 142. Although not shown, the mobile phone may further include functional modules or components such as a camera and a Bluetooth module. Details are not described herein.

Further, the processor 180 is separately connected to the RF circuit 110, the memory 120, the audio circuit 160, the I/O subsystem 170, and the power supply 190. The I/O subsystem 170 is separately connected to the another input device 130, the display 140, and the sensor 150. The RF circuit no may be configured to receive and send a signal in an information receiving and sending process or a call process. Particularly, the RF circuit no receives downlink information from a network device, and sends the downlink information to the processor 180 for processing. The memory 120 may be configured to store a software program and a module. The processor 180 runs the software program and the module that are stored in the memory 120, to perform various function applications and data processing of the mobile phone, for example, perform the method and the function of the terminal in the embodiments of this application. The another input device 130 may be configured to receive input digit or character information, and generate a keyboard signal input related to user setting and function control of the mobile phone. The display 140 may be configured to display information entered by a user or information provided for a user and various menus of the mobile phone, and may further accept a user input. The sensor 150 may be an optical sensor, a motion sensor, or another sensor. The audio circuit 160 may provide an audio interface between the user and the mobile phone. The I/O subsystem 170 is configured to control an external input/output device, and the external device may include an input controller, a sensor controller, and a display controller. The processor 180 is a control center of the mobile phone 11, connects the parts of the entire mobile phone by using various interfaces and lines, and executes various functions and processes data of the mobile phone 11 by running or executing the software program and/or the module stored in the memory 120 and invoking data stored in the memory 120, to perform overall monitoring on the mobile phone. The power source 190 (for example, a battery) is configured to supply power to each component. Preferably, the power source may be logically connected to the processor 180 by using a power source management system, to implement functions, such as charge management, discharge management, and power consumption management, by using the power source management system. In this embodiment of this application, the terminal 11 may receive configuration information of a synchronization signal block from the second network device 13 by using the RF circuit 110.

Figure 3:
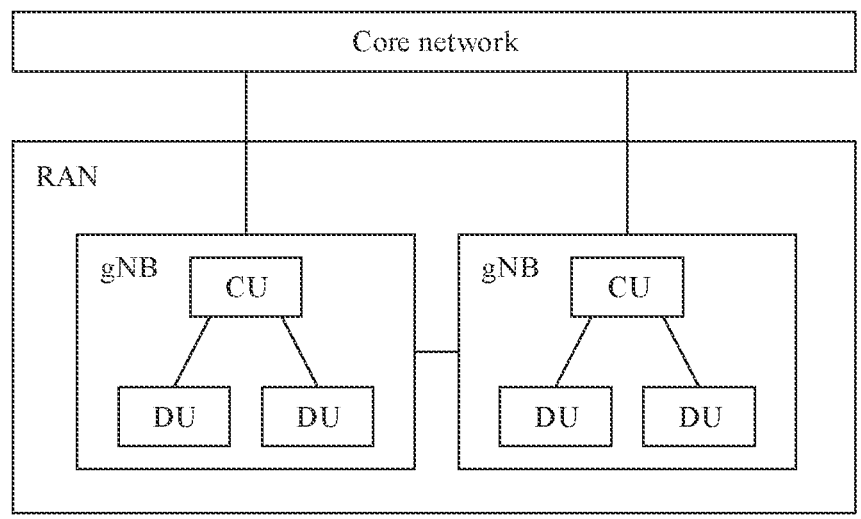
FIG. 3 is a schematic structural diagram 1 of a network device according to an embodiment of this application.

As shown in FIG. 3, the network device in the embodiments of this application may be a base station (for example, a gNB) in a RAN. The base station may be an architecture in which a centralized unit (CU) is separated from a distributed unit (DU). The RAN may be connected to a core network (which, for example, may be a long term evolution (LTE) core network, or may be a 5G core network). The CU and the DU may be understood as division of the base station from a logical function perspective. The CU and the DU may be physically separated or physically deployed together. A plurality of DUs may share one CU. One DU may alternatively be connected to a plurality of CUs (not shown). The CU and the DU may be connected by using an interface, for example, an Ft interface. The CU and the DU may be divided based on protocol layers of a wireless network. For example, a possible division manner is that the CU is configured to perform functions of a radio resource control (RRC) layer, a service data adaptation protocol (SDAP) layer, and a packet data convergence protocol (PDCP) layer, and the DU is configured to perform functions of a radio link control (RLC) layer, a media access control (MAC) layer, a physical layer, and the like. It may be understood that, division of processing functions of the CU and the DU based on the protocol layers is merely an example, and the processing functions of the CU and the DU may alternatively be divided in another manner. For example, the CU or the DU may have functions of more protocol layers after division. For example, the CU or the DU may alternatively have some processing functions of protocol layers after division. In a design, some functions of the RLC layer and functions of a protocol layer above the RLC layer are set on the CU, and remaining functions of the RLC layer and functions of a protocol layer below the RLC layer are set on the DU. In another design, functions of the CU or the DU may alternatively be divided based on a service type or another system requirement. For example, division is performed based on a delay. Functions with processing time needing to meet a delay requirement are provided by the DU, and functions that do not need to meet the delay requirement are provided by the CU. The network architecture shown in FIG. 3 may be applied to a 5G communications system, and may alternatively share one or more components or resources with an LTE system. In another design, the CU may alternatively have one or more functions of the core network. One or more CUs may be disposed in a centralized manner or a separated manner. For example, the CUs may be disposed on a network side for centralized management. The DU may have a plurality of radio frequency functions, and the radio frequency functions may be remotely set.

Functions of the CU may be implemented by one entity, or may be implemented by different entities. For example, the functions of the CU may be further divided. For example, a control plane (CP) is separated from a user plane (UP), that is, a control plane of the CU (CU-CP) is separated from a user plane of the CU (CU-UP). For example, the CU-CP and the CU-UP may be implemented by different function entities. The CU-CP and the CU-UP may be coupled to the DU to jointly implement functions of the base station.

Figure 4:
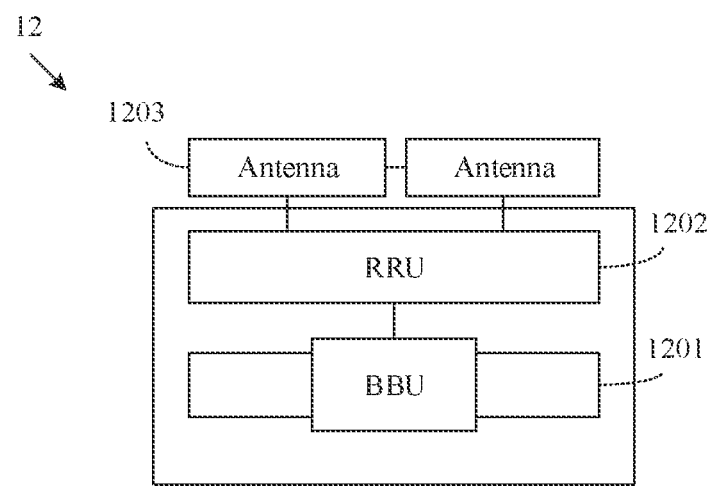
FIG. 4 is a schematic structural diagram 2 of a network device according to an embodiment of this application.

In a possible manner, an example in which the first network device 12 and the second network device 13 are base stations is used to describe a hardware architecture of the base station. As shown in FIG. 4, a base station 12 may include a building baseband unit (BBU) 1201 and a remote radio frequency module (RRU) 1202. The RRU 1202 is connected to an antenna feeder system (that is, an antenna) 1203. The BBU 1201 and the RRU 1202 may be disassembled for use according to a requirement. The antenna 1203 may be an antenna array, and includes a plurality of sub-antennas, that is, array elements. The base station may process and convert an antenna domain signal into a beam domain signal by using a codebook, and control direction angles of these array elements. In this embodiment of this application, the base station may control a part of array elements to be modulated by using a fixed codebook, and the other part to be modulated by using a random codebook. The base station may include various forms of base stations, such as a macro base station, a micro base station (also referred to as a small cell), a relay station, and an access point. In this embodiment of this application, the first network device 12 and the second network device 13 may exchange configuration information of a synchronization signal block with each other by using the RRU 1202 and the antenna feeder system (that is, the antenna) 1203. When configuring neighboring cell information for the terminal 11, the first network device 12 or the second network device 13 may send the configuration information of the synchronization signal block to the terminal 11, so that the terminal 11 may measure only a cell-defined synchronization signal block, thereby reducing power consumption of the terminal.

Figure 5:
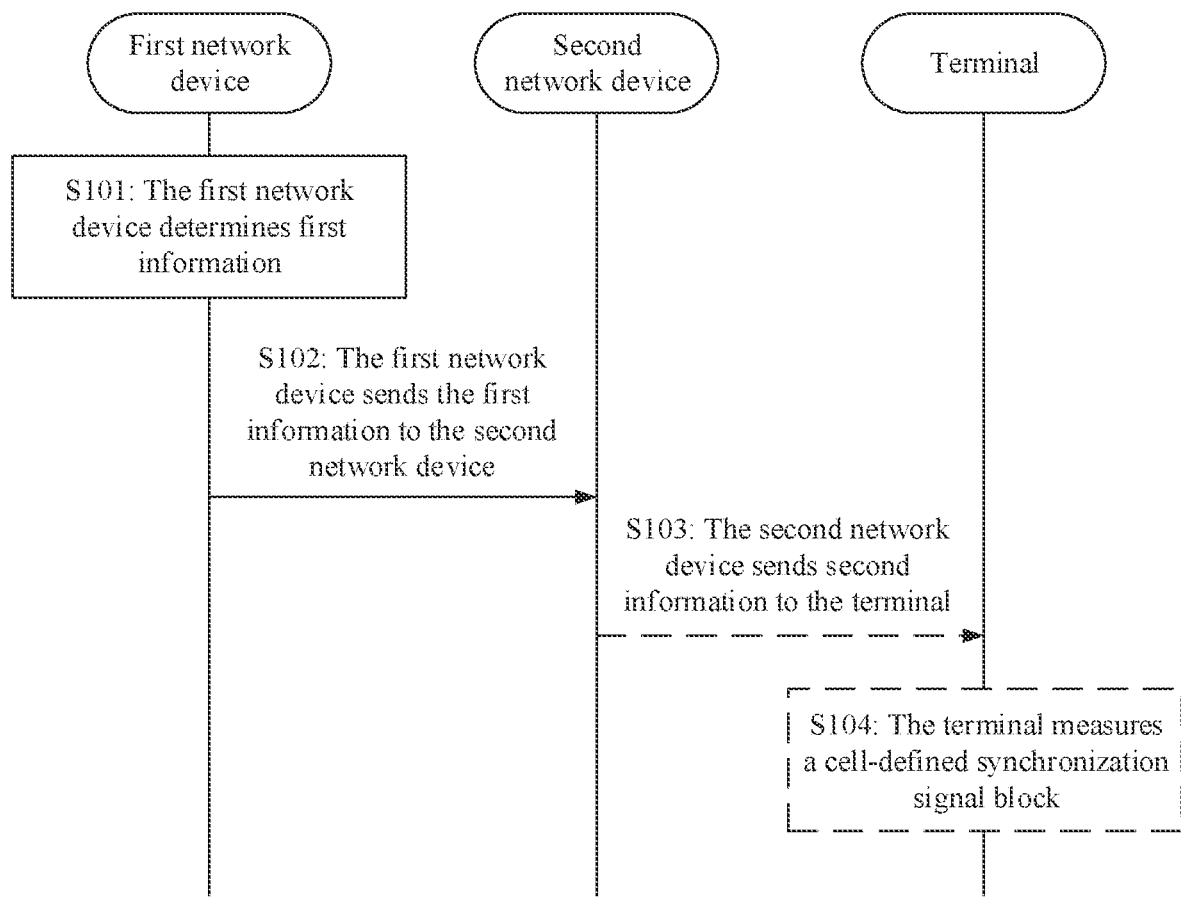
FIG. 5 is a schematic flowchart 1 of a communication method according to an embodiment of this application.

An embodiment of this application provides a communication method. As shown in FIG. 5, the method may include the following steps.

S101: A first network device determines first information.

The first information includes information related to a synchronization signal block. Optionally, the synchronization signal block in this embodiment of this application may be a synchronization signal (SS), a synchronization signal/physical broadcast channel block (SS/PBCH Block), or the like. This is not limited in this embodiment of this application.

In a possible manner, the synchronization signal block in this embodiment of this application may be at least one synchronization signal block of a first cell or a first carrier of the first network device. Optionally, the first cell may be one or more cells. Optionally, the first carrier may be one or more carriers.

In another possible manner, the synchronization signal block may be at least one synchronization signal block of a second cell or a second carrier of a second network device. Optionally, the second cell may be one or more cells. Optionally, the second carrier may be one or more carriers.

One cell or one carrier may have a plurality of synchronization signal blocks in frequency domain, and each synchronization signal block corresponds to one frequency. Optionally, the first information may include type information of the synchronization signal block. In a possible manner, the first information may further include frequency information of the synchronization signal block.

In a possible implementation, the type information of the synchronization signal block is used to indicate that the synchronization signal block is a cell-defined synchronization signal block or a non-cell-defined synchronization signal block. It may be understood that, if the synchronization signal block is a cell-defined synchronization signal block, it indicates that the synchronization signal block supports initial access, camping, cell reselection, or cell selection. If the synchronization signal block is a non-cell-defined synchronization signal block, the synchronization signal block does not support initial access, camping, cell reselection, or cell selection.

Alternatively, in another possible implementation, the type information of the synchronization signal block is used to indicate whether the synchronization signal block supports initial access, camping, cell reselection, or cell selection.

Alternatively, in still another possible implementation, the type information of the synchronization signal block is used to indicate whether the synchronization signal block is used to send basic system information. In a 5G communications network, the basic system information herein may be, for example, system information block (SIB) 1 information. In a 4G communications network, the basic system information herein may be, for example, SIB 1 information and SIB 2 information. Optionally, if the synchronization signal block is used to send the SIB 1 information, the synchronization signal block supports initial access, camping, cell reselection, or cell selection. If the synchronization signal block is not used to send the SIB 1 information, the synchronization signal block does not support initial access, camping, cell reselection, or cell selection.

Optionally, an effect that a type of the synchronization signal block indicates a cell-defined synchronization signal block or a non-cell-defined synchronization signal block may be understood as being equivalent to an effect that a type of the synchronization signal block indicates whether the synchronization signal block supports initial access, camping, cell reselection, or cell selection, or indicates whether the synchronization signal block is used to send basic system information.

Optionally, the type information of the synchronization signal block may be indicated by using at least one bit. For example, a value of the bit being 0 indicates a non-cell-defined synchronization signal block, or indicates that the synchronization signal block does not support initial access, camping, cell reselection, or cell selection, or indicates that the synchronization signal block is not used to send basic system information. A value of the bit being 1 indicates a cell-defined synchronization signal block, or indicates that the synchronization signal block supports initial access, camping, cell reselection, or cell selection, or indicates that the synchronization signal block is used to send basic system information. Alternatively, a value of the bit being 1 indicates a non-cell-defined synchronization signal block, or indicates that the synchronization signal block does not support initial access, camping, cell reselection, or cell selection, or indicates that the synchronization signal block is not used to send basic system information. A value of the bit being 0 indicates a cell-defined synchronization signal block, or indicates that the synchronization signal block supports initial access, camping, cell reselection, or cell selection, or indicates that the synchronization signal block is used to send basic system information. It may be understood that the value of the bit being 1 or 0 may alternatively be used to indicate a cell-defined synchronization signal block, or indicate that the synchronization signal block supports initial access, camping, cell reselection, or cell selection, or indicate that the synchronization signal block is used to send basic system information. However, a non-celldefined synchronization signal block, or a synchronization signal block that does not support initial access, camping, cell reselection, or cell selection, or a synchronization signal block that is not used to send basic system information may not be indicated by default. Alternatively, the value of the bit being 1 or 0 may be used to indicate that the synchronization signal block does not support initial access, camping, cell reselection, or cell selection, or indicate that the synchronization signal block is not used to send basic system information. However, a cell-defined synchronization signal block, or a synchronization signal block that supports initial access, camping, cell reselection, or cell selection, or a synchronization signal block that sends basic system information is not indicated by default. A manner of indicating the type of the synchronization signal block is not limited in this embodiment of this application.

The first information helps prevent a terminal from blindly searching all frequencies, and the terminal only measures a synchronization signal block (that is, the cell-defined synchronization signal block) that can be used for initial access, camping, cell reselection, or cell selection. This can reduce power consumption for measuring the synchronization signal block when the terminal performs initial access, camping, cell reselection, or cell selection.

Optionally, in another possible manner, the first information may include offset/index information of the at least one indicated synchronization signal block, and frequency information of the at least one indicated synchronization signal block may be determined with reference to the existing frequency information and the offset/index information.

Optionally, the first information may further include auxiliary configuration information, and the auxiliary configuration information may include any one or any combination of information used to indicate a subcarrier spacing of the synchronization signal block in frequency domain, measurement information of the synchronization signal block, information used to indicate whether timing synchronization is achieved between a neighboring cell and a serving cell or between a synchronization signal block of a neighboring cell and a serving synchronization signal block, and information used to determine whether synchronization signal blocks are synchronized in time domain. It may be understood that the first information may include at least one of the foregoing auxiliary configuration information and the type information of the synchronization signal block. This is not limited in this embodiment of this application. Optionally, the first information may be sent by using an existing message or a dedicated message. For example, the first information may be configuration information.

The measurement information of the synchronization signal block is used to indicate a location of the synchronization signal block in time domain. For example, the measurement information may include at least one of a measurement period, a measurement window, a start time, a relative offset, and measurement duration of the synchronization signal block in time domain. The information used to determine whether synchronization signal blocks are synchronized in time domain may include a system frame number (SFN) and/or time stamp information.

The auxiliary configuration information of the synchronization signal block helps the terminal further quickly determine a location of the synchronization signal block, so that a search process can be shortened, and power consumption for measuring the synchronization signal block when the terminal performs initial access, camping, cell reselection, or cell selection can be reduced.

In a possible manner, the auxiliary configuration information may alternatively be independent of the type information of the synchronization signal block. In other words, in an embodiment of this application, the first information may include the auxiliary configuration information, but does not include the type information of the synchronization signal block.

It may be understood that the first network device may determine the first information based on resource use information or other information. Optionally, the resource use information in this embodiment of this application may include at least one of the following information: load information, physical resource block utilization, congestion information, and a quantity of carried users. A manner of determining the first information is not limited in this embodiment of this application.

S102: The first network device sends the first information to the second network device.

In a possible implementation, both the first network device and the second network device are base stations. In other words, interaction between the first network device and the second network device is interaction between base stations. Optionally, the first network device is at least one network device that has an Xn interface with the second network device. The second network device is a network device that provides a service for the terminal.

In another possible implementation, the first network device is a CU, and the second network device is a DU. Alternatively, the first network device is a DU, and the second network device is a CU. In other words, interaction between the first network device and the second network device is interaction between the CU and the DU. Optionally, the first network device is at least one network device that has an Ft interface with the second network device.

For example, both the first network device and the second network device are base stations. In a process of establishing an Xn connection between the base stations, cell information or carrier information of the base stations may be exchanged. For example, the cell information may be at least one of a cell global identifier (CGI), a physical cell identifier (PCI), and frequency information of a cell of a current base station. For example, the carrier information may be at least one of frequency information and frequency domain bandwidth information of a carrier of the current base station.

In this embodiment of this application, in the process of establishing the Xn connection between the base stations, the first network device and the second network device may further exchange the first information. The synchronization signal block may be the at least one synchronization signal block of the first cell or the first carrier of the first network device.

It may be understood that the second network device may receive the first information from at least one first network device.

Optionally, as shown in FIG. 5, the foregoing method may further include step S103, or steps S103 and S104.

S103: The second network device sends second information.

Optionally, the second information is sent by the second network device, and correspondingly, the terminal receives the second information.

It may be understood that the second information is determined based on the first information, and may include information related to the synchronization signal block. Optionally, the second information may further include the auxiliary configuration information in step S101. After receiving the first information, the second network device may send the second information to the terminal in a plurality of different implementations, for example, in either of the following manners (1) and (2). This is not limited in this embodiment of this application.

Manner (1): The second information may be used to indicate at least one synchronization signal block. In a possible manner, the second information may include frequency information of the at least one indicated synchronization signal block. In another possible manner, the second information may include offset/index information of the at least one indicated synchronization signal block, and frequency information of the at least one indicated synchronization signal block may be determined with reference to the existing frequency information and the offset/index information.

It may be understood that each of the at least one synchronization signal block indicated in the second information herein may be a cell-defined synchronization signal block. As described above, the cell-defined synchronization signal block may also be referred to as a synchronization signal block that supports initial access, camping, cell reselection, or cell selection, or may be referred to as a synchronization signal block that is used to send basic system information. It may be understood that the at least one synchronization signal block indicated by the second information herein may include a synchronization signal block of a serving cell of the terminal and/or a synchronization signal block of a neighboring cell of a serving cell of the terminal. The second information may be determined based on the first information. The neighboring cell of the serving cell may be an intra-frequency neighboring cell, an inter-frequency neighboring cell, or an inter-system neighboring cell of the serving cell. For example, the second network device may learn, based on the first information, of synchronization signal blocks that are cell-defined synchronization signal blocks, to send, to the terminal, information (for example, frequency information) used to indicate these synchronization signal blocks.

In the foregoing manner, the second network device sends, to the terminal, the frequency information of the cell-defined synchronization signal block instead of frequency information of all synchronization signal blocks, so that the terminal can directly measure synchronization signal blocks at these frequencies during initial access, camping, cell reselection, or cell selection, thereby reducing power consumption for measuring the synchronization signal block when the terminal performs initial access, camping, cell reselection, or cell selection.

Manner (2): The second information may include frequency information and type information of the at least one synchronization signal block.

As described above, one bit may be used to indicate the type information of the synchronization signal block. For example, 0 indicates a non-cell-defined synchronization signal block, or indicates that the synchronization signal block does not support initial access, camping, cell reselection, or cell selection, or indicates that the synchronization signal block is not used to send basic system information, and 1 indicates a cell-defined synchronization signal block. Alternatively, 1 indicates a non-cell-defined synchronization signal block, and 0 indicates a cell-defined synchronization signal block. In a possible implementation, neighboring cell information sent by the serving cell to the terminal may include cell information or carrier information of the neighboring cell, and frequency information and type information of at least one synchronization signal block of the neighboring cell. The cell information of the neighboring cell may include at least one of an E-UTRAN cell global identifier (ECGI) and a physical cell identifier (PCI). The carrier information of the neighboring cell may include at least one of frequency information and carrier bandwidth. An example implementation is shown in Table 1, and neighboring cell information indicated by Table 1 includes cell information of a neighboring cell and frequency information and type information of a synchronization signal block of the neighboring cell.

TABLE 1

| Neighboring cell information | |
| --- | --- |
| >ECGI | |
| >PCI | |
| >New radio absolute radio frequency channel number (NR ARFCN) 1 (that is, a frequency of an SSB 1) | 1 |
| >>Type information of a synchronization signal block | 1 |
| >NR ARFCN 2 (that is, a frequency of an SSB 2) | 2 |
| >>Type information of a synchronization signal block | 0 |

The NR ARFCN indicates the frequency information of the synchronization signal block. In this embodiment, an example in which frequency information of an SSB is an ARFCN is used. Specifically, the NR ARFCNs correspond to the SSBs in Table 1. Optionally, the frequency information of the SSB may also be referred to as a global synchronization channel number. It can be learned from the table that the type information of the synchronization signal block at the frequency of the SSB 1 is 1, which may indicate that the synchronization signal block at the frequency is a cell-defined synchronization signal block; and the type information of the synchronization signal block at the frequency of the SSB 2 is 0, which may indicate that the synchronization signal block at the frequency is a non-cell-defined synchronization signal block.

In another possible manner, the second information may include offset/index information and type information of the at least one indicated synchronization signal block, and frequency information of the at least one indicated synchronization signal block may be determined with reference to the existing frequency information and the offset/index information.

The second information is determined based on the first information. For example, the second network device may transmit the first information to the terminal, or after the second network device performs processing based on the first information, the second network device transmits, to the terminal, information that is about the synchronization signal block and that needs to be notified to the terminal. This is not limited in this embodiment of this application.

It may be understood that the synchronization signal block indicated by the second information may include all or a part of the synchronization signal block indicated by the first information. This is not limited in this embodiment of this application. In this embodiment of this application, the synchronization signal block indicated by the first information may be referred to as a first synchronization signal block, and the synchronization signal block indicated by the second information may be referred to as a second synchronization signal block.

It may be understood that optionally, the second information may be sent by using an existing message or a dedicated message. This is not limited in this embodiment of this application.

S104: The terminal measures the cell-defined synchronization signal block.

After receiving the second information from the second network device, the terminal may measure the cell-defined synchronization signal block based on the second information. An occasion for measuring the cell-defined synchronization signal block is not limited in this application. Optionally, the terminal may measure the cell-defined synchronization signal block during initial access, camping, cell reselection, or cell selection.

Optionally, if the second information includes frequency information of a cell-defined second synchronization signal block, the terminal may measure the cell-defined second synchronization signal block based on the frequency information of the second synchronization signal block. The terminal may be a terminal in an idle state, an inactive state, or another non-connected state, or may be a terminal in a connected state.

Optionally, if the second information includes frequency information and type information of the second synchronization signal block, the terminal may measure, based on the frequency information of the second synchronization signal block, the cell-defined second synchronization signal block indicated by the type information. In this case, the terminal may be a terminal in an idle state, an inactive state, or another non-connected state, or may be a terminal in a connected state. Optionally, the terminal may further measure, based on the frequency information of the second synchronization signal block, a non-cell-defined second synchronization signal block indicated by the type information. In this case, the terminal may be a terminal in the connected state.

According to the communication method in this embodiment of this application, the first network device sends the first information of the synchronization signal block to the second network device, where the first information includes the type information indicating that the synchronization signal block is the cell-defined synchronization signal block or the non-cell-defined synchronization signal block. The second network device configures, for the terminal, the cell-defined synchronization signal block, or the second network device indicates, to the terminal, frequency information and type information for configuring the at least one synchronization signal block, so that the terminal determines a location of the cell-defined synchronization signal block in frequency domain. According to the communication method in this embodiment of this application, the terminal can be prevented from blindly searching all frequencies, and only measure a synchronization signal block (that is, the cell-defined synchronization signal block) that can be used for initial access, camping, cell reselection, or cell selection. This can reduce power consumption for measuring the synchronization signal block when the terminal performs initial access, camping, cell reselection, or cell selection.

It may be understood that, after receiving the second information, the terminal is not limited to performing an operation in a manner of S104, and may also perform other processing by using the second information. For example, the terminal in the connected state may also measure the non-cell-defined synchronization signal block based on the second information. This is not limited in this embodiment of this application.

The following describes the foregoing communication method by using an example in which both the first network device and the second network device are base stations. In this case, the first network device may be referred to as a first base station, and the second network device may be referred to as a second base station.

Figure 6:
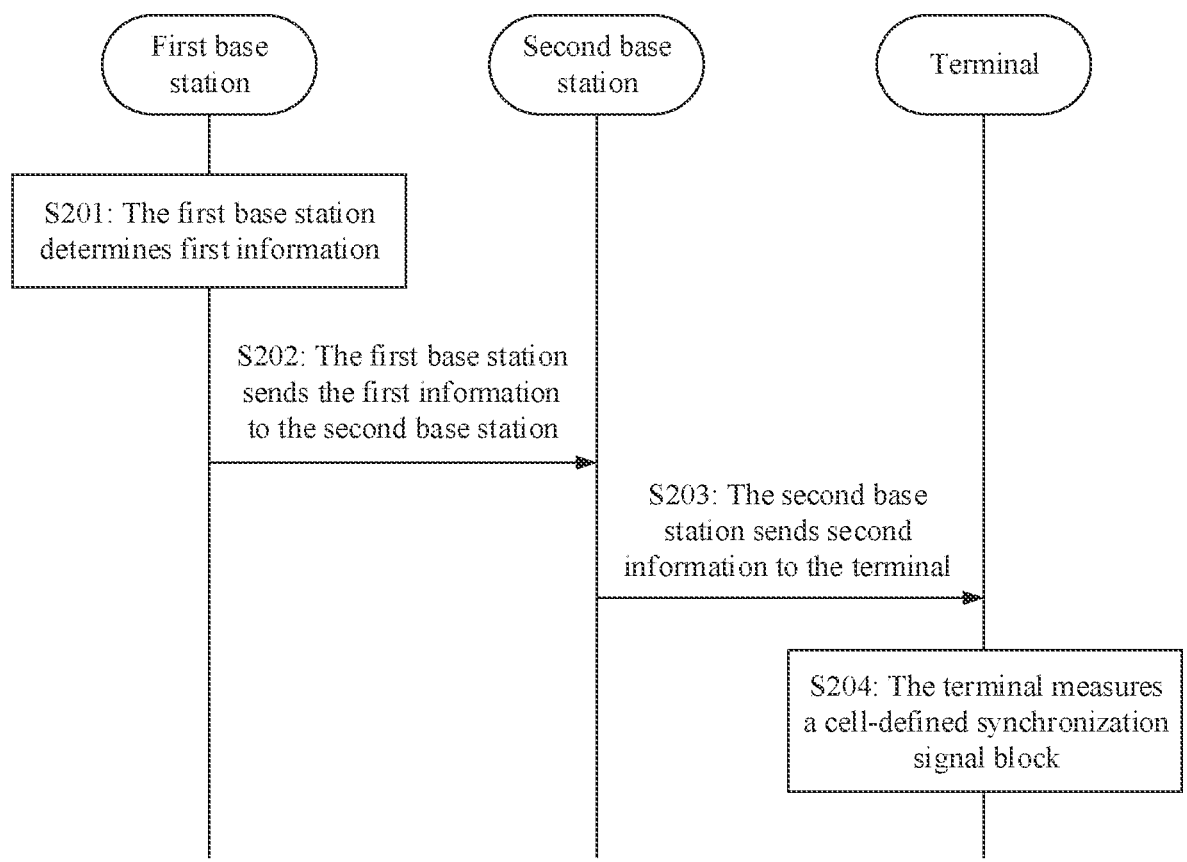
FIG. 6 is a schematic flowchart 2 of a communication method according to an embodiment of this application.

Optionally, as shown in FIG. 6, the communication method may include the following steps.

S201: The first base station determines first information.

The first information includes type information of at least one synchronization signal block of a first cell or a first carrier of the first base station.

In a possible manner, the first base station may determine the first information based on resource use information of the first cell or the first carrier of the first base station. For the resource use information, refer to the descriptions in the foregoing embodiment of this application.

For example, the resource use information is congestion information. If the first base station determines, based on a congestion rate in the first cell or the first carrier of the first base station, that a relatively large quantity of resources are used in the first cell or the first carrier, the first base station may configure the at least one synchronization signal block of the first cell or the first carrier of the first base station as a non-cell-defined synchronization signal block, to reduce a quantity of terminals that move to corresponding cells or carriers through initial access, camping, cell reselection, or cell selection, thereby reducing the congestion rate. For example, one or more cell-defined synchronization signal blocks may be reconfigured as non-cell-defined synchronization signal blocks. Alternatively, if the first base station determines, based on a congestion rate in the first cell or the first carrier, that a relatively small quantity of resources are used in the first cell or the first carrier, the first base station may configure the at least one synchronization signal block of the first cell or the first carrier as a cell-defined synchronization signal block, for example, may reconfigure one or more non-cell-defined synchronization signal blocks as cell-defined synchronization signal blocks.

For related content of step S201, further refer to related descriptions of step S101.

S202: The first base station sends the first information to the second base station.

For example, the first information may be carried in an Xn setup request message, a next-generation radio access network (NG-RAN) node configuration update message, or an Xn message between other base stations. This is not limited in this embodiment of this application.

Optionally, the second base station may send an acknowledgment message to the first base station.

The acknowledgment message is used to acknowledge a message sent by the first base station to the second base station. For example, corresponding to the Xn setup request message, the acknowledgment message is an Xn setup response message; corresponding to the NG-RAN node configuration update message, the acknowledgment message is an NG-RAN node configuration update acknowledge message; or the acknowledgment message may be an Xn acknowledgment message between the other base stations. This is not limited in this embodiment of this application.

Optionally, the acknowledgment message may further include type information of at least one synchronization signal block of the second base station.

As shown in FIG. 6, the communication method may further include step S203, or steps S203 and S204.

S203: The second base station sends second information to the terminal.

Correspondingly, the terminal receives the second information.

The second information is determined based on the first information, for example, the second information may include information about at least one synchronization signal block. It may be understood that the at least one synchronization signal block of the second information herein may include a synchronization signal block of a serving cell of the terminal and/or a synchronization signal block of a neighboring cell of a serving cell of the terminal. The second information may be determined based on the first information. The neighboring cell of the serving cell may be an intra-frequency neighboring cell, an inter-frequency neighboring cell, or an inter-system neighboring cell of the serving cell.

It may be understood that the synchronization signal block indicated by the second information may include all or a part of the synchronization signal block indicated by the first information. This is not limited in this embodiment of this application. In this embodiment of this application, the synchronization signal block indicated by the first information may be referred to as a first synchronization signal block, and the synchronization signal block indicated by the second information may be referred to as a second synchronization signal block.

S204: The terminal measures the cell-defined synchronization signal block.

For step S204, further refer to the descriptions in step S104.

According to the foregoing steps, the second base station indicates, to the terminal, a cell-defined synchronization signal block of the serving cell or the neighboring cell or frequency information and type information of the synchronization signal block. In this case, the terminal may measure only the cell-defined synchronization signal block when performing initial access, camping, cell reselection, or cell selection, so that power consumption for measuring the synchronization signal block when the terminal performs initial access, camping, cell reselection, or cell selection is reduced.

The following describes the foregoing communication method by using an example in which the first network device is a DU and the second network device is a CU.

Figure 7:
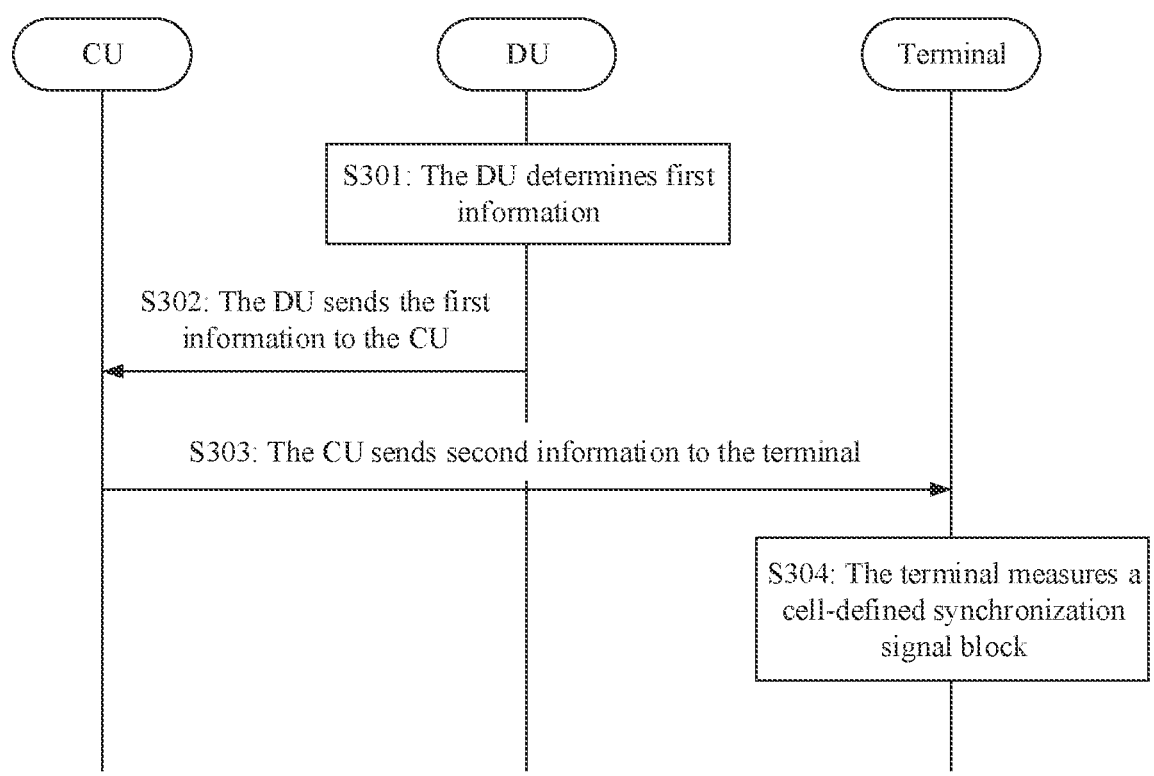
FIG. 7 is a schematic flowchart 3 of a communication method according to an embodiment of this application.

Optionally, in a possible implementation, as shown in FIG. 7, the communication method may include the following steps.

S301: The DU determines first information.

The first information includes type information of at least one synchronization signal block of a first cell or a first carrier of the DU.

In a possible manner, the DU may determine the first information based on resource use information of the first cell or the first carrier of the DU. For the resource use information, refer to the descriptions in the foregoing embodiment of this application.

For example, the resource use information is congestion information. If the DU determines, based on a congestion rate in the first cell or the first carrier of the DU, that a relatively large quantity of resources are used in the first cell or the first carrier, the DU may configure the at least one synchronization signal block of the first cell or the first carrier of the DU as a non-cell-defined synchronization signal block, to reduce a quantity of terminals that move to corresponding cells or carriers through initial access, camping, cell reselection, or cell selection, thereby reducing the congestion rate. For example, one or more cell-defined synchronization signal blocks may be reconfigured as non-cell-defined synchronization signal blocks. Alternatively, if the DU determines, based on a congestion rate in the first cell or the first carrier, that a relatively small quantity of resources are used in the first cell or the first carrier, the DU may configure the at least one synchronization signal block of the first cell or the first carrier as a cell-defined synchronization signal block, for example, may reconfigure one or more non-cell-defined synchronization signal blocks as cell-defined synchronization signal blocks.

In another possible manner, the CU may send resource use information of the CU to the DU. After the DU receives the resource use information of the CU from the CU, the DU may determine, based on the resource use information of the CU, the type information of the at least one synchronization signal block of the first cell or the first carrier of the DU. It may be understood that the DU may also determine the first information with reference to the resource use information of the first cell or the first carrier and the resource use information of the CU. A manner of determining the first information is not limited in this embodiment of this application.

S302: The DU sends the first information to the CU.

The first information may include the type information of the at least one synchronization signal block of the first cell or the first carrier of the DU. Optionally, the first information may further include the auxiliary configuration information in step S101.

For example, the first information may be carried in a reset message, an Ft setup request message, a base station distributed unit, GNB-DU) configuration update message, or another Ft message. This is not limited in this embodiment of this application.

Optionally, the CU may send an acknowledgment message to the DU.

The acknowledgment message is used to acknowledge a message sent by the DU to the CU. For example, corresponding to the reset message, the acknowledgment message is a reset acknowledge message; corresponding to the Ft setup request message, the acknowledgment message is an Ft setup response message; corresponding to the GNB-DU configuration update message, the acknowledgment message is a GNB-DU configuration update acknowledge message; or the acknowledgment message may be another Ft message. This is not limited in this embodiment of this application.

Optionally, as shown in FIG. 7, the communication method may further include step S303, or steps S303 and S304.

S303: The CU sends second information.

Optionally, the CU sends the second information to the DU, and the terminal receives the second information.

It may be understood that at least one synchronization signal block indicated by the second information herein may include a synchronization signal block of a serving cell of the terminal and/or a synchronization signal block of a neighboring cell of a serving cell of the terminal. The second information may be determined based on the first information. The neighboring cell of the serving cell may be an intra-frequency neighboring cell, an inter-frequency neighboring cell, or an inter-system neighboring cell of the serving cell.

In a possible manner, the CU may send, by using dedicated signaling, the second information to a terminal in an active state. Alternatively, the CU may send, by using a system message, the second information to a terminal in an idle state, an inactive state, or another non-connected state.

For the second information, further refer to related descriptions in the foregoing embodiment.

It may be understood that, in the CU-DU architecture, the CU that performs step S303 may be partially or completely replaced with the DU. For example, the DU may send the second information to the terminal. The at least one synchronization signal block indicated by the second information may include the synchronization signal block of the serving cell of the terminal. It may be understood that if the DU receives information that is sent by the CU and that is about a synchronization signal block of a neighboring cell of a cell of the DU, the at least one synchronization signal block of the second information may further include the synchronization signal block of the neighboring cell of the serving cell of the terminal.

It may be understood that the synchronization signal block indicated by the second information may include all or a part of the synchronization signal block indicated by the first information. This is not limited in this embodiment of this application. In this embodiment of this application, the synchronization signal block indicated by the first information may be referred to as a first synchronization signal block, and the synchronization signal block indicated by the second information may be referred to as a second synchronization signal block.

S304: The terminal measures the cell-defined synchronization signal block.

For step S304, further refer to the descriptions in step S104.

According to the foregoing steps, the CU indicates, to the terminal, a cell-defined synchronization signal block of the first cell or the first carrier of the DU or frequency information and type information of the synchronization signal block. Optionally, the CU may further indicate, to the terminal, a cell-defined synchronization signal block of a neighboring cell of the first cell or the first carrier of the DU or frequency information and type information of the synchronization signal block. In this case, the terminal may measure only the cell-defined synchronization signal block of the neighboring cell when performing initial access, camping, cell reselection, or cell selection, so that power consumption for measuring the synchronization signal block when the terminal performs initial access, camping, cell reselection, or cell selection is reduced.

The following describes the foregoing communication method by using an example in which the first network device is a CU and the second network device is a DU.

Figure 8:
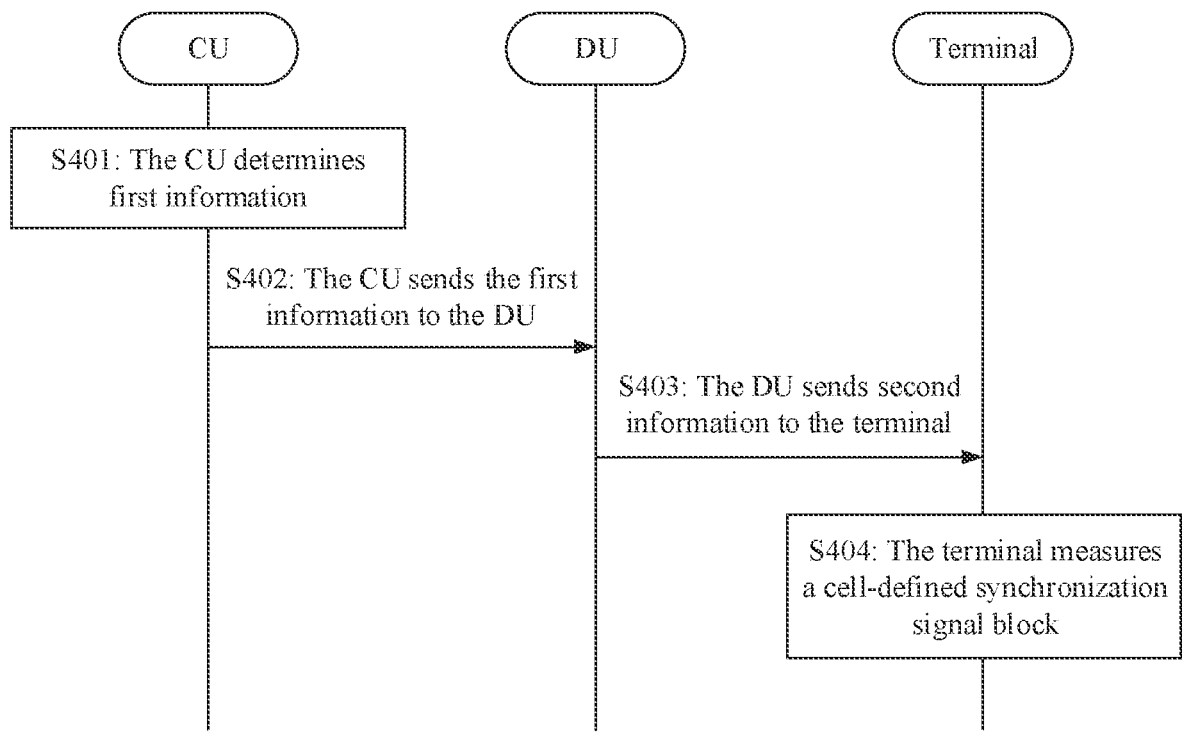
FIG. 8 is a schematic flowchart 4 of a communication method according to an embodiment of this application.

Optionally, in a possible implementation, as shown in FIG. 8, the communication method may include the following steps.

S401: The CU determines first information.

The first information may include type information of at least one synchronization signal block of a second cell or a second carrier of the DU.

In a possible manner, the CU may determine the first information based on resource use information of the CU. For the resource use information, refer to the descriptions in the foregoing embodiment of this application.

For example, the resource use information is congestion information. If the CU determines, based on a congestion rate in the CU, that a relatively large quantity of resources are used in the CU, the CU may configure the at least one synchronization signal block of the second cell or the second carrier of the DU as a non-cell-defined synchronization signal block. For example, one or more cell-defined synchronization signal blocks may be reconfigured as non-cell-defined synchronization signal blocks. Alternatively, if the CU determines, based on a congestion rate in the CU, that a relatively small quantity of resources are used in the CU, the CU may configure the at least one synchronization signal block of the second cell or the second carrier of the DU as a cell-defined synchronization signal block. For example, one or more non-cell-defined synchronization signal blocks may be reconfigured as cell-defined synchronization signal blocks.

In another possible manner, the DU may send, to the CU, resource use information of the second cell or the second carrier of the DU. After the CU receives the resource use information of the second cell or the second carrier from the DU, the CU may determine the first information based on the resource use information of the second cell or the second carrier. It may be understood that the CU may also determine the first information with reference to the resource use information, of the second cell or the second carrier, received from the DU and the resource use information of the CU. In still another possible manner, a DU that sends resource use information to the CU may be different from a DU that is used by the CU to determine the type information. For example, a first DU may send, to the CU, resource use information of a first cell or a first carrier of the first DU. After the CU receives the resource use information of the first cell or the first carrier from the first DU, the CU may determine the first information based on the resource use information of the first cell or the first carrier. The first information may include type information of at least one synchronization signal block of a second cell or a second carrier of a second DU.

A manner of determining the first information is not limited in this embodiment of this application.

For the resource use information, refer to the descriptions in the foregoing embodiment of this application. Details are not described herein again.

S402: The CU sends the first information to the DU.

For the first DU and the second DU in step S401, the CU may send the first information to the first DU and/or the second DU. A specific DU to which the first information is sent may be determined based on a resource use status of the DU or another policy. This is not limited in this embodiment of this application.

Optionally, the first information may further include the auxiliary configuration information in step S101.

For example, the first information may be carried in a reset message, an Ft setup request message, a base station centralized unit (gNode B centralized unit, GNB-CU) configuration update message, or another Ft message. This is not limited in this embodiment of this application.

It may be understood that the first information may further include auxiliary configuration information of a synchronization signal block of a neighboring cell of the DU. Optionally, the first information may further include frequency information, or frequency information and type information of the synchronization signal block of the neighboring cell of the DU.

Optionally, the DU may send an acknowledgment message to the CU.

The acknowledgment message is used to acknowledge a message sent by the CU to the DU. For example, corresponding to the reset message, the acknowledgment message is a reset acknowledge message; corresponding to the Ft setup request message, the acknowledgment message is an Ft setup response message; corresponding to the GNB-CU configuration update message, the acknowledgment message is a GNB-CU configuration update acknowledge message; or the acknowledgment message may be another Ft message. This is not limited in this embodiment of this application.

Optionally, as shown in FIG. 8, the communication method may further include step S403, or steps S403 and S404.

S403: The DU sends second information to the terminal.

Correspondingly, the terminal receives the second information.

It may be understood that at least one synchronization signal block of the second information herein may include a synchronization signal block of a serving cell of the terminal and/or a synchronization signal block of a neighboring cell of a serving cell of the terminal. The second information may be determined based on the first information. The neighboring cell of the serving cell may be an intra-frequency neighboring cell, an inter-frequency neighboring cell, or an inter-system neighboring cell of the serving cell.

In a possible manner, the DU may send, by using a system message, the second information to a terminal in an idle state or an inactive state. In this case, the synchronization signal block may be the synchronization signal block of the serving cell. Alternatively, the DU may send, by using a system message, the second information to a terminal in an idle state or an inactive state.

It may be understood that, in the CU-DU architecture, the DU that performs step S403 may be partially or completely replaced with the CU. For example, the CU may send the second information to the terminal. The at least one synchronization signal block of the second information may include the synchronization signal block of the serving cell of the terminal. It may be understood that the at least one synchronization signal block of the second information may further include the synchronization signal block of the neighboring cell of the serving cell of the terminal.

It may be understood that the synchronization signal block indicated by the second information may include all or a part of the synchronization signal block indicated by the first information. This is not limited in this embodiment of this application. In this embodiment of this application, the synchronization signal block indicated by the first information may be referred to as a first synchronization signal block, and the synchronization signal block indicated by the second information may be referred to as a second synchronization signal block.

S404: The terminal measures the cell-defined synchronization signal block.

For step S404, refer to the descriptions in step S104.

According to the foregoing steps, the DU indicates, to the terminal, a cell-defined synchronization signal block of the serving cell or the neighboring cell of the DU or frequency information and type information of the synchronization signal block. In this case, the terminal may measure only the cell-defined synchronization signal block of these cells when performing initial access, camping, cell reselection, or cell selection, so that power consumption for measuring the synchronization signal block when the terminal performs initial access, camping, cell reselection, or cell selection is reduced.

It may be understood that, in the foregoing embodiments, an operation or a step implemented by the first network device may also be implemented by a component (for example, a chip or a circuit) that can be used in the first network device, an operation or a step implemented by the second network device may also be implemented by a component (for example, a chip or a circuit) that can be used in the second network device, and an operation or a step implemented by the terminal may also be implemented by a component (for example, a chip or a circuit) that can be used in the terminal.

It should be further understood that in the embodiments of this application, "first", "second", and the like are merely intended to indicate different objects, and do not indicate other limitations on the indicated objects.

An embodiment of this application further provides a first communications apparatus, which may be configured to perform a function of the first network device in the foregoing method. In the embodiments of this application, the first communications apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used.

Figure 9:
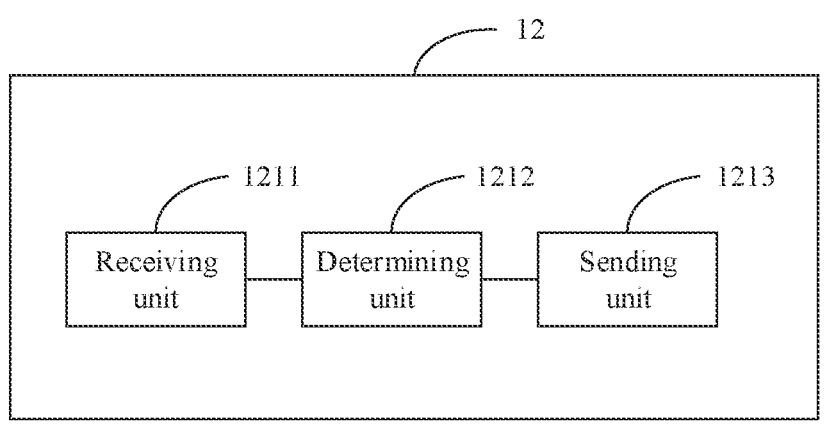
FIG. 9 is a schematic structural diagram 1 of a first communications apparatus according to an embodiment of this application.

When each functional module is obtained through division based on each corresponding function, FIG. 9 is a possible schematic structural diagram of the first communications apparatus in the foregoing embodiments. A first communications apparatus 12 includes: a determining unit 1212 and a sending unit 1213. Optionally, the first communications apparatus 12 may further include a receiving unit 1211. The foregoing units are configured to support the first communications apparatus in performing the related method in any one of FIG. 5 to FIG. 8. The first communications apparatus provided in this application is configured to perform the corresponding method provided above. Therefore, for corresponding features and beneficial effects that can be achieved by the first communications apparatus, refer to the beneficial effects in the corresponding method provided above. Details are not described herein again.

For example, the receiving unit 1211 is configured to support the first communications apparatus 12 in performing the process S301 in FIG. 7 and the process S401 in FIG. 8. The determining unit 1212 is configured to support the first communications apparatus 12 in performing the process S101 in FIG. 5, the process S201 in FIG. 6, the process S301 in FIG. 7, and the process S401 in FIG. 8. The sending unit 1213 is configured to support the first communications apparatus 12 in performing the process S102 in FIG. 5, the process S202 in FIG. 6, the process S302 in FIG. 7, and the process S402 in FIG. 8. All related content of the steps in the foregoing method embodiments may be cited in function descriptions of a corresponding functional module, and details are not described herein again.

In a possible manner, the determining unit 1212 is configured to determine first information, where the first information includes type information of a synchronization signal block, and the type information of the synchronization signal block is used to indicate that the synchronization signal block is a cell-defined synchronization signal block or a non-cell-defined synchronization signal block. The sending unit 1213 is configured to send the first information to a second communications apparatus.

In a possible implementation, the synchronization signal block is at least one synchronization signal block of a first cell or a first carrier of the first communications apparatus.

In a possible implementation, the synchronization signal block is a synchronization signal block of a second cell or a second carrier of the second communications apparatus. Optionally, the type information of the synchronization signal block may be determined based on resource use information of the first communications apparatus.

In a possible implementation, the synchronization signal block is a synchronization signal block of a second cell or a second carrier of the second communications apparatus. The receiving unit 1211 is configured to receive resource use information of the second cell or the second carrier from the second communications apparatus. The determining unit 1212 is configured to determine type information of the synchronization signal block of the second cell or the second carrier of the second communications apparatus based on the resource use information of the second cell or the second carrier.

In a possible implementation, the first communications apparatus is configured to perform functions of a radio resource control (RRC) layer, a service data adaptation protocol (SDAP) layer, and a packet data convergence protocol (PDCP) layer; and the second communications apparatus is configured to perform functions of a radio link control (RLC) layer, a media access control (MAC) layer, and a physical layer.

In a possible implementation, the first information may further include at least one of the following information: information used to indicate a subcarrier spacing of the synchronization signal block in frequency domain; measurement information of the synchronization signal block; information used to indicate whether timing synchronization is achieved between a neighboring cell and a serving cell or between a synchronization signal block of a neighboring cell and a serving synchronization signal block; and information used to determine whether synchronization signal blocks are synchronized in time domain.

Figure 10:
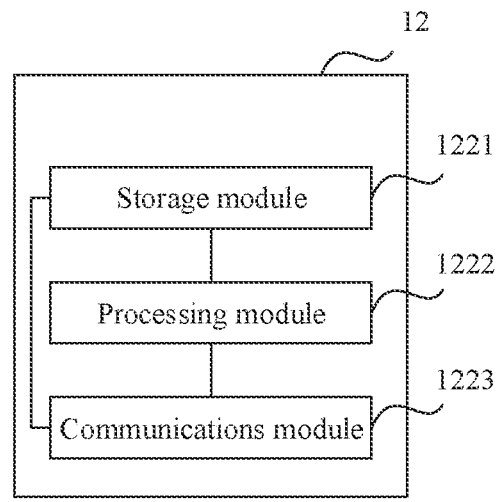
FIG. 10 is a schematic structural diagram 2 of a first communications apparatus according to an embodiment of this application.

FIG. 10 is another possible schematic structural diagram of the first communications apparatus in the foregoing embodiments. A first communications apparatus 12 includes a processing module 1222 and a communications module 1223. Optionally, the first communications apparatus 12 may further include a storage module 1221. The foregoing modules are configured to support the first communications apparatus in performing the related method in any one of FIG. 5 to FIG. 8. The first communications apparatus provided in this application is configured to perform the corresponding method provided above. Therefore, for corresponding features and beneficial effects that can be achieved by the first communications apparatus, refer to the beneficial effects in the corresponding method provided above. Details are not described herein again.

In a possible manner, the processing module 1222 is configured to control and manage an action of the first communications apparatus 12 or perform a corresponding processing function. The communications module 1223 is configured to support the first communications apparatus 12 in performing functions of the receiving unit 1211 and the sending unit 1212. The storage module 1221 is configured to store program code and/or data of the first communications apparatus.

The processing module 1222 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing module 1222 may implement or execute various example logical blocks, modules, and circuits described with reference to content disclosed in this application. The processor may also be a combination processors for implementing a computing function, for example, a combination of one or more microprocessors, or a combination of the DSP and a microprocessor. The communications module 1223 may be a transceiver, a transceiver circuit, Bluetooth, a network interface, a communications interface, or the like. The storage module 1221 may be a memory.

In a possible manner, the processing module 1222 may be the processor in the BBU 1201 in FIG. 4, the communications module 1223 may be the RF circuit in the RRU 1202 in FIG. 4, and the storage module 1221 may be the memory in the BBU 1201 in FIG. 4.

Figure 11:
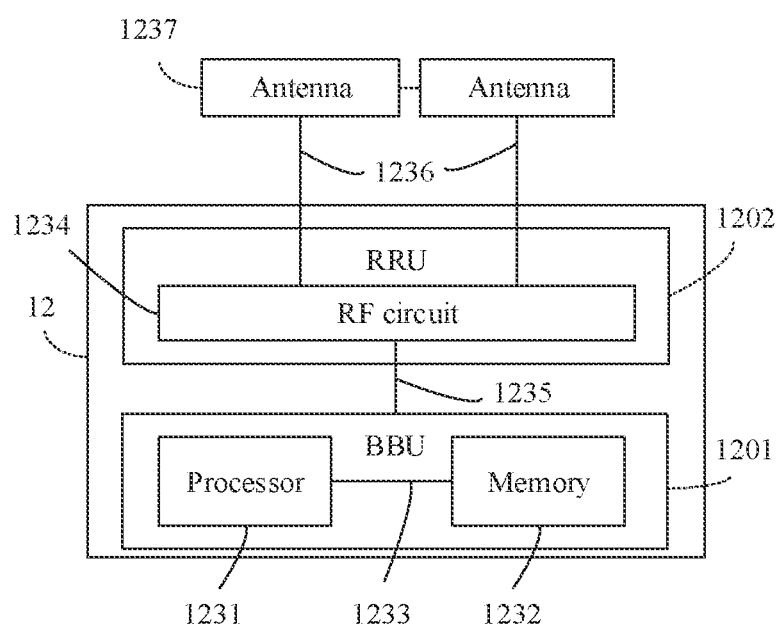
FIG. 11 is a schematic structural diagram 3 of a first communications apparatus according to an embodiment of this application.

When the processing module 1222 is a processor, the communications module 1223 is an RF circuit, and the storage module 1221 is a memory, the first communications apparatus in this application may be the first communications apparatus 12 shown in FIG. 11.

Referring to FIG. 11, the first communications apparatus 12 includes a processor 1231, a memory 1232, a bus system 1233, an RF circuit 1234, an optical fiber 1235, a coaxial cable 1236, an antenna 1237, and one or more programs. The processor 1231 and the memory 1232 of the BBU 1201 are connected to each other by using the bus system 1233. The RF circuit 1234 in the RRU 1202 and the BBU 1201 are connected to each other by using the optical fiber 1235. The RF circuit 1234 in the RRU 1202 and the antenna 1237 are connected to each other by using the coaxial cable 1236. The bus system may be a peripheral component interconnect bus, an extended industry standard architecture bus, or the like. The bus may be classified into an address bus, a data bus, a control bus, and the like. For ease of representation, only one thick line is used to represent the bus in the figure, but this does not mean that there is only one bus or only one type of bus. The one or more programs are stored in the memory, the one or more programs include an instruction, and when the instruction is executed by the first communications apparatus, the first communications apparatus is enabled to perform the related method in any one of FIG. 5 to FIG. 8.

An embodiment of this application further provides a first communications apparatus, including a processor and a memory. The memory is configured to store a program, and the processor invokes the program stored in the memory, so that the first communications apparatus performs the related method in any one of FIG. 5 to FIG. 8.

An embodiment of this application further provides a computer storage medium that stores one or more programs. The computer storage medium stores a computer program. When the computer program is executed by a processor, a first communications apparatus is enabled to perform the related method in any one of FIG. 5 to FIG. 8.

An embodiment of this application further provides a computer program product including an instruction. When the computer program product runs on a first communications apparatus, the first communications apparatus is enabled to perform the related method in any one of FIG. 5 to FIG. 8.

An embodiment of this application provides a chip system. The chip system includes a processor, configured to support a first communications apparatus in implementing functions in the foregoing aspects, for example, determining first information, where the first information includes type information of a synchronization signal block, and the type information of the synchronization signal block is used to indicate that the synchronization signal block is a cell-defined synchronization signal block or a non-cell-defined synchronization signal block; and sending the first information to a second communications apparatus. In a possible design, the chip system further includes a memory. The memory is configured to store a program instruction and data that are necessary for a terminal device. The chip system may include a chip, an integrated circuit, or may include a chip and another discrete device. This is not specifically limited in this embodiment of this application.

The first communications apparatus, the computer storage medium, the computer program product, or the chip system provided in this application is configured to perform the corresponding method provided above. Therefore, for beneficial effects that can be achieved by the first communications apparatus, the computer storage medium, the computer program product, or the chip system, refer to the beneficial effects in the corresponding method provided above. Details are not described herein again.

It may be understood that the first communications apparatus may be a first network device, or may be a component (a chip, a circuit, or the like) that can be used for a first network device.

An embodiment of this application further provides a second communications apparatus, which may be configured to perform a function of the second network device in the foregoing method. In the embodiments of this application, the second communications apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used.

Figure 12:
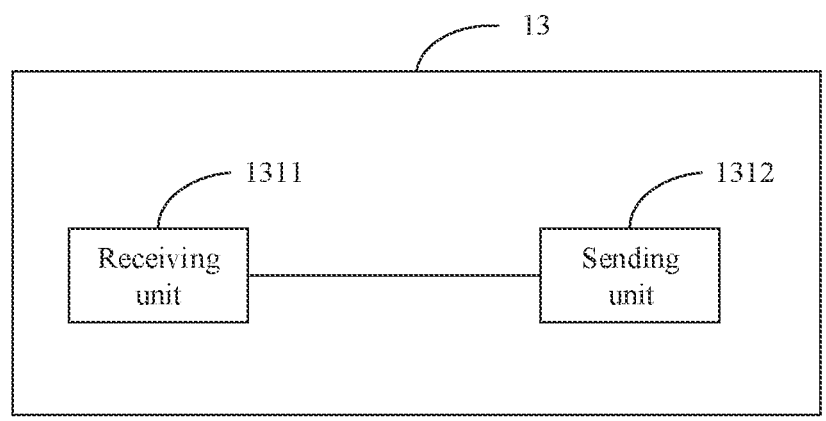
FIG. 12 is a schematic structural diagram 1 of a second communications apparatus according to an embodiment of this application.

FIG. 12 is a possible schematic structural diagram of the second communications apparatus in the foregoing embodiments. A second communications apparatus 13 includes: a receiving unit 1311 and a sending unit 1312. The foregoing units are configured to support the second communications apparatus in performing the related method in any one of FIG. 5 to FIG. 8. The second communications apparatus provided in this application is configured to perform the corresponding method provided above. Therefore, for corresponding features and beneficial effects that can be achieved by the second communications apparatus, refer to the beneficial effects in the corresponding method provided above. Details are not described herein again.

For example, the receiving unit 1311 is configured to support the second communications apparatus 13 in performing the process S102 in FIG. 5, the process S202 in FIG. 6, the process S302 in FIG. 7, and the process S402 in FIG. 8. The sending unit 1312 is configured to support the second communications apparatus 13 in performing the process S103 in FIG. 5, the process S203 in FIG. 6, the process S303 in FIG. 7, and the process S403 in FIG. 8. All related content of the steps in the foregoing method embodiments may be cited in function descriptions of a corresponding functional module, and details are not described herein again.

In a possible manner, the receiving unit 1311 is configured to receive first information from a first communications apparatus, where the first information includes type information of a first synchronization signal block, and the type information of the first synchronization signal block is used to indicate that the first synchronization signal block is a cell-defined synchronization signal block or a non-cell-defined synchronization signal block. The sending unit 1312 is configured to send second information to a terminal, where the second information may be determined based on the first information.

In a possible implementation, the first synchronization signal block is at least one synchronization signal block of a first cell or a first carrier of the first communications apparatus.

In a possible implementation, the first synchronization signal block is a synchronization signal block of a second cell or a second carrier of the second communications apparatus, and the sending unit 1312 is further configured to send resource use information of the second cell or the second carrier to the first communications apparatus.

In a possible implementation, the second information includes frequency information of a cell-defined second synchronization signal block.

In a possible implementation, the second information includes frequency information and type information of a second synchronization signal block.

In a possible implementation, the first communications apparatus is configured to perform functions of a radio resource control (RRC) layer, a service data adaptation protocol (SDAP) layer, and a packet data convergence protocol (PDCP) layer; and the second communications apparatus is configured to perform functions of a radio link control (RLC) layer, a media access control (MAC) layer, and a physical layer.

In a possible implementation, the first information may further include at least one of the following information: information used to indicate a subcarrier spacing of the synchronization signal block in frequency domain; measurement information of the synchronization signal block; information used to indicate whether timing synchronization is achieved between a neighboring cell and a serving cell or between a synchronization signal block of a neighboring cell and a serving synchronization signal block; and information used to determine whether synchronization signal blocks are synchronized in time domain.

Figure 13:
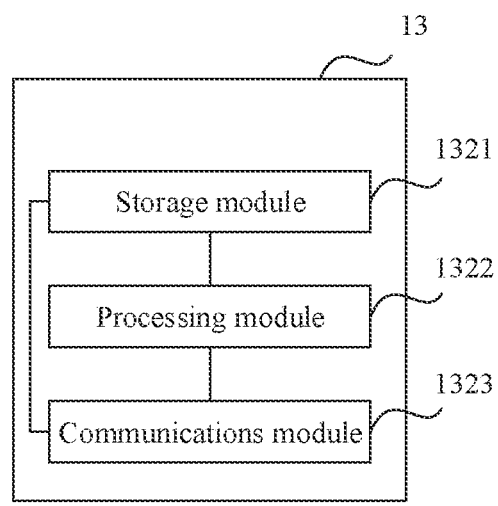
FIG. 13 is a schematic structural diagram 2 of a second communications apparatus according to an embodiment of this application.

FIG. 13 is another possible schematic structural diagram of the second communications apparatus in the foregoing embodiments. A second communications apparatus 13 includes a processing module 1322 and a communications module 1323. Optionally, the second communications apparatus 13 may further include a storage module 1321. The foregoing modules are configured to support the second communications apparatus in performing the related method in any one of FIG. 5 to FIG. 8. The second communications apparatus provided in this application is configured to perform the corresponding method provided above. Therefore, for corresponding features and beneficial effects that can be achieved by the second communications apparatus, refer to the beneficial effects in the corresponding method provided above. Details are not described herein again.

In a possible manner, the processing module 1322 is configured to control and manage an action of the second communications apparatus 13 or perform a corresponding processing function. The communications module 1323 is configured to support the second communications apparatus 13 in performing functions of the receiving unit 1311 and the sending unit 1312. The storage module 1321 is configured to store program code and/or data of the second communications apparatus.

The processing module 1322 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing module 1322 may implement or execute various example logical blocks, modules, and circuits described with reference to content disclosed in this application. The processor may also be a combination implementing a computing function, for example, a combination of one or more microprocessors, or a combination of the DSP and a microprocessor. The communications module 1323 may be a transceiver, a transceiver circuit, Bluetooth, a network interface, a communications interface, or the like. The storage module 1321 may be a memory.

In a possible manner, the processing module 1322 may be the processor in the BBU 1201 in FIG. 4, the communications module 1323 may be the RF circuit in the RRU 1202 in FIG. 4, and the storage module 1321 may be the memory in the BBU 1201 in FIG. 4.

When the processing module 1322 is a processor, the communications module 1323 is an RF circuit, and the storage module 1321 is a memory, the second communications apparatus in this application may have a structure similar to that of the first communications apparatus 12 shown in FIG. 11, and details are not described herein again.

An embodiment of this application further provides a second communications apparatus, including a processor and a memory. The memory is configured to store a program, and the processor invokes the program stored in the memory, so that the second communications apparatus performs the related method in any one of FIG. 5 to FIG. 8.

An embodiment of this application further provides a computer storage medium that stores one or more programs. The computer storage medium stores a computer program. When the computer program is executed by a processor, a second communications apparatus is enabled to perform the related method in any one of FIG. 5 to FIG. 8.

An embodiment of this application further provides a computer program product including an instruction. When the computer program product runs on a second communications apparatus, the second communications apparatus is enabled to perform the related method in any one of FIG. 5 to FIG. 8.

An embodiment of this application provides a chip system. The chip system includes a processor, configured to support a second communications apparatus in implementing functions in the foregoing aspects, for example, receiving first information from a first communications apparatus, where the first information includes type information of a first synchronization signal block, and the type information of the first synchronization signal block is used to indicate that the first synchronization signal block is a cell-defined synchronization signal block or a non-cell-defined synchronization signal block; and sending second information, where the second information is determined based on the first information. In a possible design, the chip system further includes a memory. The memory is configured to store a program instruction and data that are necessary for a terminal device. The chip system may include a chip, an integrated circuit, or may include a chip and another discrete device. This is not specifically limited in this embodiment of this application.

The second communications apparatus, the computer storage medium, the computer program product, or the chip system provided in this application is configured to perform the corresponding method provided above. Therefore, for beneficial effects that can be achieved by the second communications apparatus, the computer storage medium, the computer program product, or the chip system, refer to the beneficial effects in the corresponding method provided above. Details are not described herein again.

It may be understood that the second communications apparatus may be a second network device, or may be a component (a chip, a circuit, or the like) that can be used for a second network device.

An embodiment of this application further provides a communications apparatus, configured to perform a function of the terminal in the foregoing method. In the embodiments of this application, the communications apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used.

Figure 14:
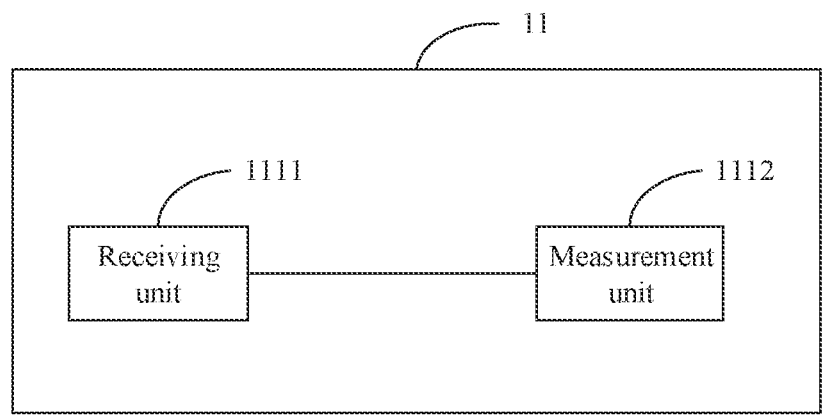
FIG. 14 is a schematic structural diagram 2 of a terminal according to an embodiment of this application.

FIG. 14 is a possible schematic structural diagram of the communications apparatus in the foregoing embodiments. A communications apparatus 11 includes: a receiving unit 1111 and a measurement unit 1112. The foregoing units are configured to support the communications apparatus in performing the related method in any one of FIG. 5 to FIG. 8. The communications apparatus provided in this application is configured to perform the corresponding method provided above. Therefore, for corresponding features and beneficial effects that can be achieved by the communications apparatus, refer to the beneficial effects in the corresponding method provided above. Details are not described herein again.

For example, the receiving unit 1111 is configured to support the communications apparatus 11 in performing the process S103 in FIG. 5, the process S203 in FIG. 6, the process S303 in FIG. 7, and the process S403 in FIG. 8. The measurement unit 1112 is configured to support the communications apparatus 11 in performing the process S104 in FIG. 5, the process S204 in FIG. 6, the process S304 in FIG. 7, and the process S404 in FIG. 8. All related content of the steps in the foregoing method embodiments may be cited in function descriptions of a corresponding functional module, and details are not described herein again.

In a possible manner, the receiving unit 1111 is configured to receive frequency information and type information of at least one synchronization signal block, where the type information of the synchronization signal block is used to indicate that the synchronization signal block is a cell-defined synchronization signal block or a non-cell-defined synchronization signal block; and the measurement unit 1112 is configured to measure the synchronization signal block based on the frequency information and the type information of the at least one synchronization signal block.

In a possible implementation, second information includes frequency information of a cell-defined second synchronization signal block, and the measurement unit 1112 is specifically configured to measure the cell-defined second synchronization signal block based on the frequency information.

In a possible implementation, second information includes frequency information and type information of a second synchronization signal block, and the measurement unit 1112 is specifically configured to measure, based on the frequency information, the cell-defined second synchronization signal block indicated by the type information.

In a possible implementation, the measurement unit 1112 is further configured to measure, based on the frequency information, a non-cell-defined second synchronization signal block indicated by the type information.

In a possible implementation, first information or the second information further includes at least one of the following information: information used to indicate a subcarrier spacing of the synchronization signal block in frequency domain; measurement information of the synchronization signal block; information used to indicate whether timing synchronization is achieved between a neighboring cell and a serving cell or between a synchronization signal block of a neighboring cell and a serving synchronization signal block; and information used to determine whether synchronization signal blocks are synchronized in time domain.

Figure 15:
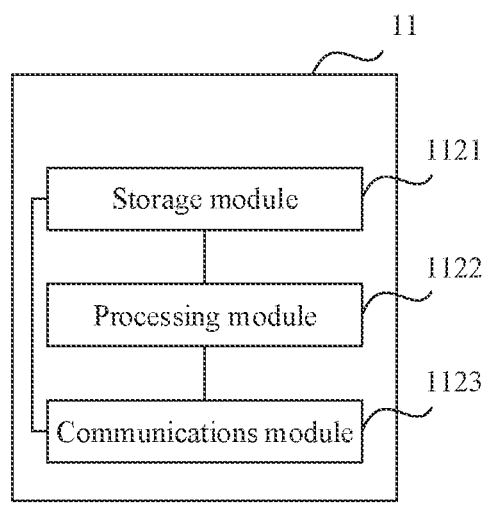
FIG. 15 is a schematic structural diagram 3 of a terminal according to an embodiment of this application.

FIG. 15 is another possible schematic structural diagram of the communications apparatus in the foregoing embodiments. A communications apparatus 11 includes a processing module 1122 and a communications module 1123. Optionally, the communications apparatus 11 may further include a storage module 1121. The foregoing modules are configured to support the communications apparatus in performing the related method in any one of FIG. 5 to FIG. 8. The communications apparatus provided in this application is configured to perform the corresponding method provided above. Therefore, for corresponding features and beneficial effects that can be achieved by the communications apparatus, refer to the beneficial effects in the corresponding method provided above. Details are not described herein again.

In a possible manner, the processing module 1122 is configured to control and manage an action of the communications apparatus 11 or perform a corresponding processing function. The communications module 1123 is configured to support the communications apparatus 11 in performing functions of the receiving unit 1111. The storage module 1121 is configured to store program code and/or data of the communications apparatus.

The processing module 1122 may be a processor or a controller, for example, may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing module 1122 may implement or execute various example logical blocks, modules, and circuits described with reference to content disclosed in this application. The processor may also be a combination implementing a computing function, for example, a combination of one or more microprocessors, or a combination of the DSP and a microprocessor. The communications module 1123 may be a transceiver, a transceiver circuit, Bluetooth, a network interface, a communications interface, or the like. The storage module 1121 may be a memory.

In a possible manner, the processing module 1122 may be the processor 180 in FIG. 2, the communications module 1123 may be the RF circuit 110 in FIG. 2, and the storage module 1121 may be the memory 120 in FIG. 2.

Figure 16:
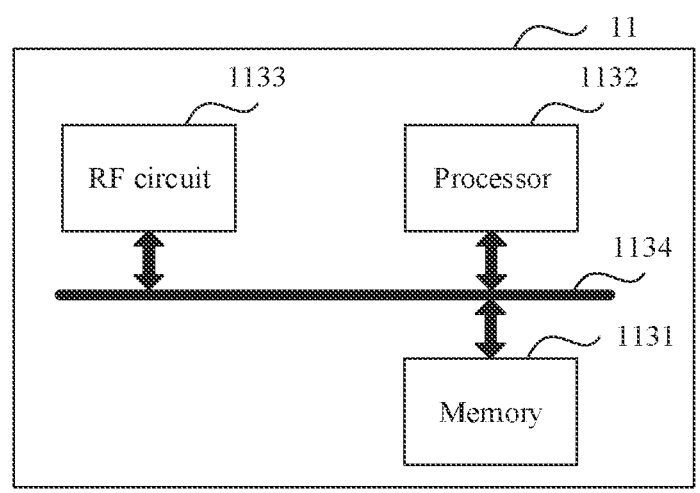
FIG. 16 is a schematic structural diagram 4 of a terminal according to an embodiment of this application.

When the processing module 1122 is a processor, the communications module 1123 is an RF circuit, and the storage module 1121 is a memory, the communications apparatus in this application may be a communications apparatus 11 shown in FIG. 16.

Referring to FIG. 16, the communications apparatus 11 includes one or more processors 1132, an RF circuit 1133, a memory 1131, a bus system 1134, and one or more programs. The RF circuit 1133, the processor 1132, and the memory 1131 are connected to each other by using the bus system 1134. The bus system 1134 may be a peripheral component interconnect bus, an extended industry standard architecture bus, or the like. The bus may be classified into an address bus, a data bus, a control bus, and the like. For ease of representation, only one thick line is used to represent the bus in the figure, but this does not mean that there is only one bus or only one type of bus. The one or more programs are stored in the memory 1131, the one or more programs include an instruction, and when the instruction is executed by the communications apparatus, the communications apparatus is enabled to perform the related method in any one of FIG. 5 to FIG. 8.

An embodiment of this application further provides a communications apparatus, including a processor and a memory. The memory is configured to store a program, and the processor invokes the program stored in the memory, so that the communications apparatus performs the related method in any one of FIG. 5 to FIG. 8.

An embodiment of this application further provides a computer storage medium that stores one or more programs. The computer storage medium stores a computer program. When the computer program is executed by a processor, a communications apparatus is enabled to perform the related method in any one of FIG. 5 to FIG. 8.

An embodiment of this application further provides a computer program product including an instruction. When the computer program product runs on a communications apparatus, the communications apparatus is enabled to perform the related method in any one of FIG. 5 to FIG. 8.

An embodiment of this application provides a chip system. The chip system includes a processor, configured to support a communications apparatus in implementing functions in the foregoing aspects, for example, receiving second information from a network device, where the second information is determined based on first information, the first information includes type information of a first synchronization signal block, and the type information of the first synchronization signal block is used to indicate that the first synchronization signal block is a cell-defined synchronization signal block or a non-cell-defined synchronization signal block; and measuring the cell-defined synchronization signal block. In a possible design, the chip system further includes a memory. The memory is configured to store a program instruction and data that are necessary for the communications apparatus. The chip system may include a chip, an integrated circuit, or may include a chip and another discrete device. This is not specifically limited in this embodiment of this application.

The communications apparatus, the computer storage medium, the computer program product, or the chip system provided in this application is configured to perform the corresponding method provided above. Therefore, for beneficial effects that can be achieved by the communications apparatus, the computer storage medium, the computer program product, or the chip system, refer to the beneficial effects in the corresponding method provided above. Details are not described herein again.

It may be understood that the communications apparatus may be a terminal, or may be a component (a chip, a circuit, or the like) that can be used for a terminal.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   at least one processor; and
   a memory coupled to the at least one processor and having a computer program stored thereon, wherein the apparatus is a first network device or applicable in the first network device, and wherein the at least one processor is configured to execute instructions of the computer program to enable the apparatus to perform:
   determining a configuration message, wherein the configuration message comprises type information of a first synchronization signal block, and the type information of the first synchronization signal block indicates whether the first synchronization signal block supports initial access, camping, cell reselection, or cell selection, and wherein the first synchronization signal block is a synchronization signal block of a first cell of the first network device or of a first carrier of the first network device; and
   sending the configuration message indicating whether the first synchronization signal block supports the initial access, the camping, the cell reselection, or the cell selection to a second network device using an Xn interface or an F1 interface.

2. The apparatus according to claim 1, wherein
   the first network device is a centralized unit, and the second network device is a distributed unit; or
   the first network device is the distributed unit, and the second network device is the centralized unit.

3. The apparatus according to claim 1, wherein the configuration message further comprises at least one of following information:
   information indicating a subcarrier spacing of the first synchronization signal block in a frequency domain;
   measurement information of the first synchronization signal block;
   information indicating whether timing synchronization is achieved between a neighboring cell and a serving cell or between a synchronization signal block of the neighboring cell and a serving synchronization signal block; or
   information based on which whether synchronization signal blocks are synchronized in a time domain is determined.

4. The apparatus of claim 1, wherein the type information indicates whether the first synchronization signal block is used to send basic system information.

5. An apparatus, comprising:
   at least one processor; and
   a memory coupled to the at least one processor and having a computer program stored thereon, wherein the apparatus is a second network device or applicable in the second network device, and wherein the at least one processor is configured to execute instructions of the computer program, the instructions enabling the apparatus to perform:

receiving a configuration message from a first network device using an Xn interface or an F1 interface, wherein the configuration message comprises type information of a first synchronization signal block, and the type information of the first synchronization signal block indicates whether the first synchronization signal block supports initial access, camping, cell reselection, or cell selection, and wherein the first synchronization signal block is a synchronization signal block of a first cell of the first network device or of a first carrier of the first network device; and determining, according to the configuration message, whether the first synchronization signal block supports the initial access, the camping, the cell reselection, or the cell selection.

6. The apparatus according to claim 5, wherein
the first network device is a centralized unit, and the second network device is a distributed unit; or
the first network device is the distributed unit, and the second network device is the centralized unit.

7. The apparatus according to claim 5, wherein the configuration message further comprises at least one of following information:
information indicating a subcarrier spacing of the first synchronization signal block in a frequency domain;
measurement information of the first synchronization signal block;
information indicating whether timing synchronization is achieved between a neighboring cell and a serving cell or between a synchronization signal block of the neighboring cell and a serving synchronization signal block; and
information based on which whether synchronization signal blocks are synchronized in time domain is determined.

8. The apparatus of claim 5, wherein the type information indicates whether the first synchronization signal block is used to send basic system information.

9. A system, comprising:
a first network device; and
a second network device, wherein the first network device is configured to:

determine a configuration message, wherein the configuration message comprises type information of a first synchronization signal block, and the type information of the first synchronization signal block indicates whether the first synchronization signal block supports initial access, camping, cell reselection, or cell selection, and wherein the first synchronization signal block is a synchronization signal block of a first cell of the first network device or of a first carrier of the first network device; and send the configuration message indicating whether the first synchronization signal block supports the initial access, the camping, the cell reselection, or the cell selection to the second network device using an Xn interface or an F1 interface, and wherein the second network device is configured to:
receive the configuration message from the first network device using the Xn interface or the F1 interface; and
determine, according to the configuration message, whether the first synchronization signal block supports the initial access, the camping, the cell reselection, or the cell selection.

10. The system according to claim 9, wherein
the first network device is a centralized unit, and the second network device is a distributed unit; or
the first network device is the distributed unit, and the second network device is the centralized unit.

11. The system according to claim 9, wherein the configuration message further comprises at least one of following information:
information indicating a subcarrier spacing of the first synchronization signal block in a frequency domain;
measurement information of the first synchronization signal block;
information indicating whether timing synchronization is achieved between a neighboring cell and a serving cell or between a synchronization signal block of the neighboring cell and a serving synchronization signal block; or
information based on which whether synchronization signal blocks are synchronized in a time domain is determined.

12. The system of claim 9, wherein the type information indicates whether the first synchronization signal block is used to send basic system information.

* * * * *